(12) United States Patent
Lee et al.

(10) Patent No.: US 12,063,346 B2
(45) Date of Patent: Aug. 13, 2024

(54) ELECTRONIC DEVICE FOR DISPLAYING CONTENT AND METHOD OF OPERATION THEREOF

(71) Applicant: Samsung Electronics Co., Ltd., Gyeonggi-do (KR)

(72) Inventors: Jinchoul Lee, Gyeonggi-do (KR); Junwhon Uhm, Gyeonggi-do (KR); Heonjun Ha, Gyeonggi-do (KR); Seungnyun Kim, Gyeonggi-do (KR); Hyunsoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 17/555,667

(22) Filed: Dec. 20, 2021

(65) Prior Publication Data

US 2022/0217325 A1    Jul. 7, 2022

Related U.S. Application Data

(63) Continuation of application No. PCT/KR2021/019040, filed on Dec. 15, 2021.

(30) Foreign Application Priority Data

Jan. 5, 2021   (KR) .................... 10-2021-0001015

(51) Int. Cl.
*H04N 13/398* (2018.01)
*G06F 3/01* (2006.01)
(Continued)

(52) U.S. Cl.
CPC ........... *H04N 13/398* (2018.05); *G06F 3/013* (2013.01); *G06F 3/015* (2013.01); *G06V 40/15* (2022.01);
(Continued)

(58) Field of Classification Search
CPC .... H04N 13/398; H04N 13/383; H04N 23/58; H04N 23/64; H04N 13/332;
(Continued)

(56) References Cited

U.S. PATENT DOCUMENTS 6,483,485 B1 * 11/2002 Huang .................... G06F 3/011
                                                          348/E5.12
9,794,550 B2   10/2017 Khabiri et al.
(Continued)

FOREIGN PATENT DOCUMENTS

CN    105718043 A  *  6/2016  ............. G09G 5/377
CN    107510460 A     12/2017
(Continued)

OTHER PUBLICATIONS

International Search Report dated Mar. 29, 2022.
European Search Report dated May 3, 2024.

*Primary Examiner* — Trang U Tran
(74) *Attorney, Agent, or Firm* — Cha & Reiter, LLC

(57) ABSTRACT

Disclosed is an electronic device including a camera module, a display that displays AR content or VR content, at least one processor operatively connected to the camera module and the display, and a memory operatively connected to the at least one processor and storing the AR content or VR content. The memory may store one or more instructions that, when executed, cause the at least one processor to obtain eye tracking data by using the camera module, to determine an eye fatigue level based on the eye tracking data, and to select one mode between a first mode for changing a setting of the display and a second mode for changing both the setting of the display and an output setting of the AR content or VR content, depending on the eye fatigue level. In addition, other various embodiments identified through the specification are also possible.

18 Claims, 12 Drawing Sheets

(51) Int. Cl.
  *G06V 40/10* (2022.01)
  *G06V 40/18* (2022.01)
  *G06V 40/19* (2022.01)
  *H04N 13/383* (2018.01)
  *H04N 23/58* (2023.01)
  *H04N 23/60* (2023.01)
  *H04N 13/332* (2018.01)

(52) U.S. Cl.
  CPC ............ *G06V 40/19* (2022.01); *G06V 40/197* (2022.01); *H04N 13/383* (2018.05); *H04N 23/58* (2023.01); *H04N 23/64* (2023.01); *H04N 13/332* (2018.05)

(58) Field of Classification Search
  CPC ...... G06V 40/197; G06V 40/15; G06V 40/19; G06F 3/013; G06F 3/015
  USPC .......................................................... 348/669
  See application file for complete search history.

(56) References Cited

U.S. PATENT DOCUMENTS

| | | | |
|---|---|---|---|
| 9,953,615 B2 | 4/2018 | Kwon | |
| 9,999,835 B2 | 6/2018 | Watson | |
| 10,108,853 B2* | 10/2018 | Lee | ........................ G06V 40/20 |
| 10,130,279 B2 | 11/2018 | Moon et al. | |
| 10,394,324 B2 | 8/2019 | Drake et al. | |
| 10,561,334 B2 | 2/2020 | Moon et al. | |
| 10,792,569 B2 | 10/2020 | Watson | |
| 10,929,957 B2* | 2/2021 | Li | ............................ G06T 5/002 |
| 2015/0213634 A1* | 7/2015 | Karmarkar | ............ G06T 11/001 |
| | | | 345/589 |
| 2016/0178904 A1 | 6/2016 | Deleeuw et al. | |
| 2017/0127040 A1 | 5/2017 | Khabiri et al. | |
| 2017/0276948 A1 | 9/2017 | Welch et al. | |
| 2018/0192023 A1 | 7/2018 | Sun et al. | |
| 2018/0260026 A1 | 9/2018 | Drake et al. | |
| 2019/0114841 A1 | 4/2019 | Sato | |
| 2019/0244369 A1 | 8/2019 | Lim et al. | |
| 2020/0319466 A1 | 10/2020 | Welch et al. | |

FOREIGN PATENT DOCUMENTS

| | | |
|---|---|---|
| EP | 3 310 047 A1 | 4/2018 |
| JP | 2014-53743 A | 3/2014 |
| JP | 2019-74962 A | 5/2019 |
| KR | 10-1645795 B1 | 8/2016 |
| KR | 10-2016-0116576 A | 10/2016 |
| KR | 10-2016-0130015 A | 11/2016 |
| KR | 10-2017-0055135 A | 5/2017 |
| KR | 10-2017-0087728 A | 7/2017 |
| KR | 10-2018-0005528 A | 1/2018 |
| KR | 10-2018-0122726 A | 11/2018 |
| KR | 10-2019-0090998 A | 8/2019 |

* cited by examiner

ELECTRONIC DEVICE FOR DISPLAYING CONTENT AND METHOD OF OPERATION THEREOF

CROSS-REFERENCE TO RELATED APPLICATION(S)

This application is a Continuation based on and claims priority under 35 U.S.C. § 120 to PCT International Application No. PCT/KR2021/019040, which was filed on Dec. 15, 2021, and claims priority to Korean Patent Application No. 10-2021-0001015, filed on Jan. 5, 2021, in the Korean Intellectual Property Office, the disclosure of which are incorporated by reference herein their entirety.

BACKGROUND

One or more embodiments disclosed in this specification generally relate to an electronic device for displaying content and an operating method thereof.

Virtual reality (VR) is a technology that generates and displays a virtual environment similar to a real environment, one where the user can interact with virtual objects.

Augmented reality (AR) is a technology that synthesizes virtual objects with the real environment and then displays the synthesized result.

An electronic device including a head mounted display (HMD) may display VR content or AR content in front of a user's eyes such that the user feels as if he/she is present in VR or AR environment. The electronic device may recognize an external environment viewed by the user and may provide the AR content reflecting the recognized result. The electronic device including the HMD may be implemented, for example, as a pair of glasses.

SUMMARY

A conventional VR or AR device provides high realism and immersion by implementing 3D stereoscopic effects. On the other hand, conventional VR devices or AR devices may cause issue for users.

For example, while users of VR devices or AR devices view content or after the users view content, the users may feel eye fatigue and headache. In severe cases, the users may feel visual fatigue enough to cause pain. Visual fatigue is the most frequent symptom when the users employ VR devices or AR devices, and urgently needs to be addressed.

For example, factors causing the visual fatigue may include the display, visual content, viewer characteristics, or viewing environment. For example, as the resolution or luminance of a display increases, eye fatigue may increase. Accordingly, the eye fatigue may be reduced by lowering the resolution or brightness of the display.

The conventional VR or AR device may increase the user's eye fatigue by uniformly displaying content without taking into account the user's eye fatigue.

According to an embodiment disclosed in the specification, an electronic device may include a camera module, a display that displays AR content or VR content including at least one object, at least one processor operatively connected to the camera module and the display, and a memory operatively connected to the at least one processor and storing the AR content or VR content. The memory may store one or more instructions that, when executed, cause the at least one processor to obtain eye tracking data by using the camera module, to determine an eye fatigue level based on the eye tracking data, and to select one mode between a first mode for changing a setting of the display and a second mode for changing both the setting of the display and an output setting of the AR content or VR content, depending on the eye fatigue level.

Furthermore, according to an embodiment disclosed in the specification, a method for operating an electronic device for displaying content may include obtaining eye tracking data by using a camera module, determining an eye fatigue level based on the eye tracking data, and selecting one mode between a first mode for changing a setting of a display and a second mode for changing both the setting of the display and an output setting of the content, depending on the eye fatigue level.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components will be marked by the same or similar reference signs.

DETAILED DESCRIPTION

According to certain embodiments disclosed in the specification, it is possible to provide an electronic device that reduces the user's eye fatigue by changing at least one of a setting of a display or an output setting of content based on the user's eye fatigue, and an operating method thereof.

Besides, various other effects directly or indirectly understood through the specification may be provided.

Figure 1:
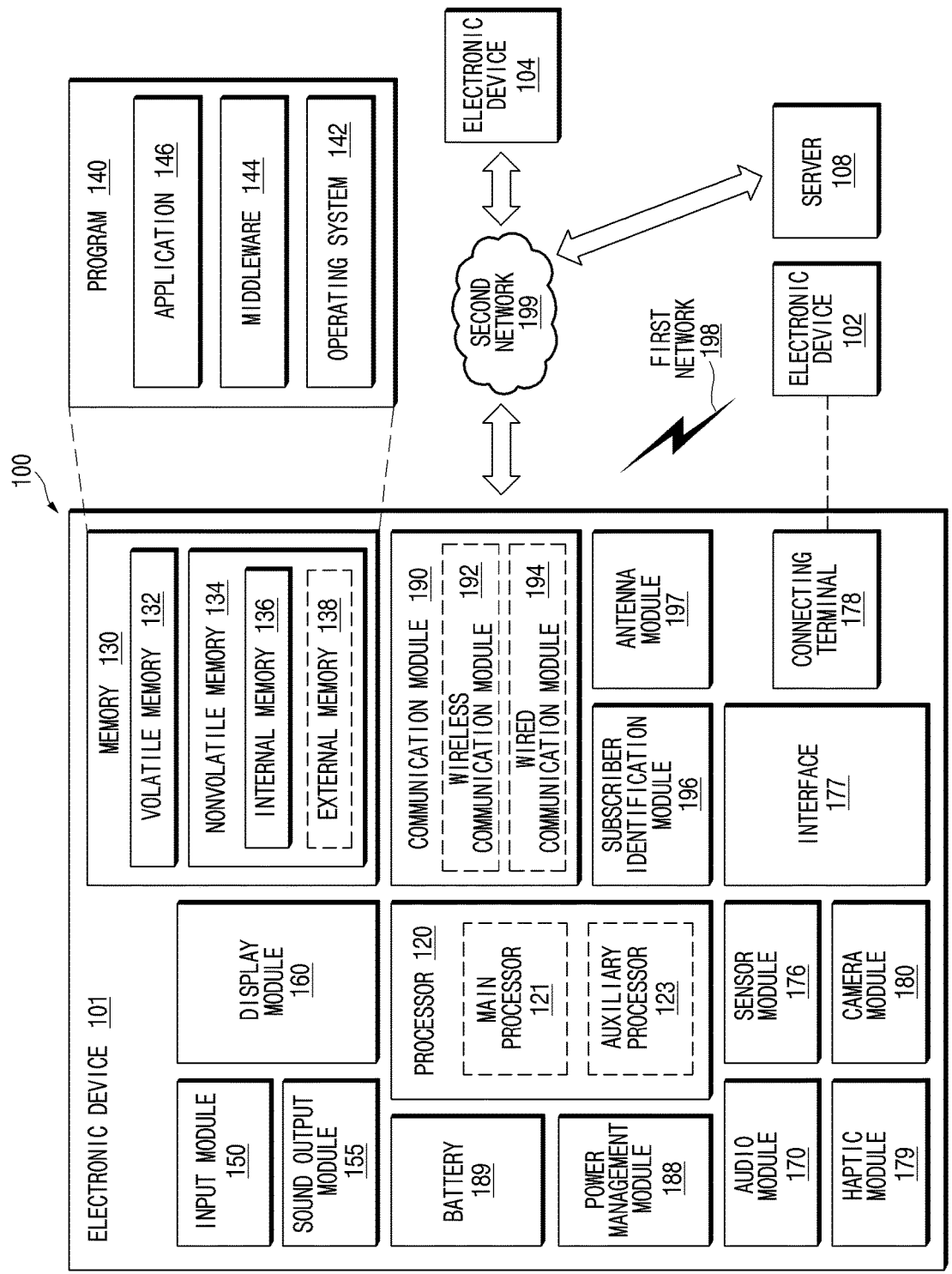
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, structure and components of an electronic device according to an embodiment will be described with reference to FIG. 2.

Figure 2:
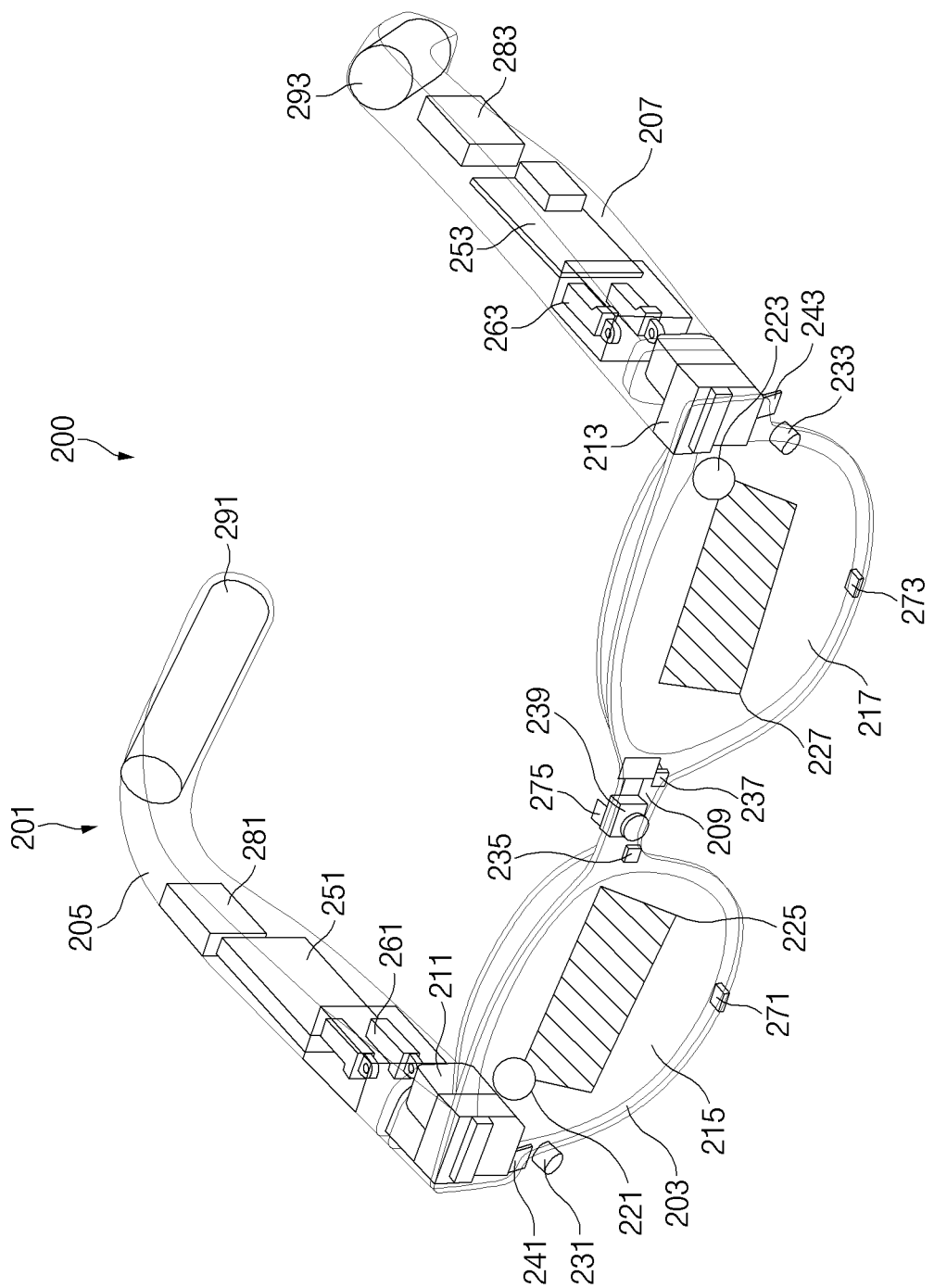
FIG. 2 is a diagram illustrating components of an electronic device, according to an embodiment.

FIG. 2 is a diagram 200 illustrating components of an electronic device 201, according to an embodiment. According to an embodiment, the electronic device 201 may be worn on the user's head. For example, the electronic device 201 may be a pair of glasses, but is not limited thereto. According to an embodiment, the electronic device 201 as a pair of glasses may include a frame 203 formed along an edge of a display positioned to face the user's eyes when the user wears the electronic device 201, and a temple (e.g., a first temple member 205 and a second temple member 207) hung on the user's ear and connected to the frame 203 so as to place the frame 203 in front of the user's eyes. According to an embodiment, the temple may include a hinge (e.g., a first hinge 261 and a second hinge 263) connecting the temple and the frame 203. According to an embodiment, the frame 203 may include a first portion surrounding the first display 211 and a second portion surrounding the second display 213. According to an embodiment, the frame 203 may include a bridge 209 connecting the first portion and the second portion. According to an embodiment, there may be a plurality of temples. For example, two temples may be connected to the first portion and the second portion, respectively. For example, the first portion may be connected to the first temple member 205 by the first hinge 261. The second portion may be connected to the second temple member 207 by the second hinge 263. The first temple member 205 and the second temple member 207 may be folded to overlap the frame 203 by the first hinge 261 and the second hinge 263.

Referring to FIG. 2, the electronic device 201 according to an embodiment may include a display (e.g., the first display 211 and the second display 213) (e.g., the display module 160 of FIG. 1), a transparent member (e.g., a first transparent member 215 and a second transparent member 217), a waveguide (e.g., a first waveguide 225 and a second waveguide 227), an input optical member (e.g., a first input optical member 221 and a second input optical member 223), a camera module (e.g., a first camera 231, a second camera 233, a third camera 235, a fourth camera 237, and a fifth camera 239) (e.g., the camera module 180 of FIG. 1), an illumination (e.g., a first light emitting diode (LED) 241 and a second LED 243), a printed circuit board (PCB) (e.g., a first PCB 251 and a second PCB 253), a hinge (e.g., the first hinge 261 and the second hinge 263), a microphone (e.g., a first microphone 271, a second microphone 273, and a third microphone 275) (e.g., the input module 150 of FIG. 1), a speaker (e.g., a first speaker 281 and a second speaker 283) (e.g., the sound output module 155 of FIG. 1), and a battery (e.g., a first battery 291 and a second battery 293) (e.g., the battery 189 of FIG. 1).

The display according to an embodiment may include the first display 211 and the second display 213. For example, the display may include a liquid crystal display (LCD), a digital mirror device (DMD), a liquid crystal on silicon (LCoS) device, and an organic light emitting diode (OLED), or a micro light emitting diode (micro LED).

According to an embodiment, when the display is composed of one of LCD, DMD or LCoS, the electronic device 201 may include a backlight that emits light to a screen display area of a display.

According to an embodiment, when the display is composed of OLED or micro LED, the pixels of the display may generate light by themselves, and thus the electronic device 201 may provide the user with a virtual image having a specific quality or higher because a separate backlight is not needed. According to an embodiment, when the display is composed of OLED or micro LED, the separate backlight is unnecessary, and thus the weight of electronic device 201 may be reduced.

According to an embodiment, the transparent member may include the first transparent member 215 and the second transparent member 217. For example, the transparent member may be formed of a glass plate, a plastic plate, or a polymer. According to an embodiment, the transparent member may be made transparent or translucent. According to an embodiment, the first transparent member 215 may be arranged to face the user's right eye. The second transparent member 217 may be arranged to face the user's left eye.

According to an embodiment, the electronic device 201 may be positioned at a location facing the user's right and left eyes. The electronic device 201 may include a transparent display, and may implement a screen display area on the display.

According to an embodiment, the waveguide may include the first waveguide 225 and the second waveguide 227. According to an embodiment, the waveguide may deliver the light generated by the display (e.g., the first display 211 and/or the second display 213) to the user's eyes. For example, the first waveguide 225 may deliver the light generated by the first display 211 to the user's right eye, and the second waveguide 227 may deliver the light generated by the second display 213 to the user's left eye. For example, the waveguide may be made of glass, plastic or polymer, and may include a nanopattern (e.g., a grating structure having a polygonal or curved shape) formed therein or on one surface. According to an embodiment, light incident to one end of the waveguide may be propagated inside the waveguide by a nanopattern and may be provided to the user. For example, the waveguide formed of a free-form prism may provide the incident light to the user through a reflection mirror.

According to an embodiment, the waveguide may include at least one of at least one diffractive element (e.g., a diffractive optical element (DOE) or a holographic optical element (HOE)) or a reflective element (e.g., a reflective mirror). The waveguide may guide the display light emitted from an illumination to the user's eyes by using the at least one diffractive element or the reflective element. For example, the diffractive element may include an input optical member (e.g., the first input optical member 221 and the second input optical member 223) and/or an output optical member (not shown). The first input optical member 221 and/or the second input optical member 223 may be referred to as an "input grating area". The output optical member (not shown) may be referred to as an "output grating area". The input grating area may diffract or reflect light output from a light source (e.g., a micro LED) to deliver the light to a transparent member (e.g., the first transparent member 215 and/or the second transparent member 217) of a screen display unit. The output grating area may diffract or reflect the light delivered to the transparent member (e.g., the first transparent member 215 and/or the second transparent member 217) of the waveguide in a direction of the user's eyes. For example, the reflective element may include a total internal reflection (TIR) optical element or a TIR waveguide for TIR. The TIR may be referred to as "one manner" for guiding light. The TIR may mean that light (e.g., an image) is incident such that all of the light input through the input grating area is reflected from one surface (e.g., a specific surface) of the waveguide, and then all of the light is delivered to the output grating area. According to an embodiment, the light emitted from the display may be guided to the waveguide through the input optical member (e.g., the first input optical member 221 and the second input optical member 223). The light traveling inside the waveguide may be induced toward the user's eye through an output optical member. According to an embodiment, the screen display area may be determined depending on the light emitted toward the user's eyes. According to an embodiment, the first waveguide 225 and the second waveguide 227 may be referred to differently as a "screen display area." According to an embodiment, the first waveguide 225 may be at least a partial area of the first display 211. The second waveguide 227 may be at least a partial area of the second display 213. In the embodiment shown in FIG. 2, each of the first waveguide 225 and the second waveguide 227 are implemented in a quadrangle as an example, but not limited thereto.

According to an embodiment, the electronic device 201 may include a first camera module (e.g., the first camera 231 and the second camera 233). The electronic device 201 may perform head tracking, hand detection and tracking, gesture recognition, and spatial recognition of three degrees of freedom (3 DoF) or six degrees of freedom (6 DoF) by using the first camera module. For example, the first camera 231 and the second camera 233 may be global shutter (GS) cameras having the same specifications and performance (e.g., same or similar angles of view, shutter speeds, resolutions, and/or the number of color bits). The electronic device 201 may support simultaneous localization and mapping (SLAM) technology by performing spatial recognition and/or depth information acquisition by using stereo cameras arranged on the left and right sides. According to an embodiment, SLAM technology may refer to the technology in which a mobile robot measures its location while moving around an unknown environment, and creates a map of the surrounding environment at the same time. In addition, the electronic device 201 may recognize the user's gesture by using the stereo cameras arranged on the left/right sides. The electronic device 201 may detect faster hand gestures and finer movements by using a GS camera that has distortion less than a rolling shutter (RS) camera.

According to an embodiment, the electronic device 201 may include a second camera module (e.g., the third camera 235 and the fourth camera 237). According to an embodiment, the electronic device 201 may detect and track a pupil by using the second camera module. For example, the electronic device 201 may position the center of the virtual image displayed on the display so as to correspond to the gaze direction of the pupil of a user wearing the electronic device 201, by using pupil information obtained by the second camera module. According to an embodiment, the second camera module may include a camera for tracking a right eye (e.g., the third camera 235) and a camera for tracking a left eye (e.g., the fourth camera 237). The third camera 235 and the fourth camera 237 may be GS cameras having the same specifications and performance (e.g., an angle of view, a shutter speed, a resolution, and/or the number of color bits). According to an embodiment, the electronic device 201 may track the pupil's fast movement by using a GS camera without screen afterimage.

According to an embodiment, the electronic device 201 may include a third camera module (e.g., the fifth camera 239). According to an embodiment, the third camera module may be referred to as a high-resolution camera or a photo/video camera. According to an embodiment, the third camera module may be a high-resolution camera. For example, the third camera module may be a color camera, which includes auto focus (AF) and/or optical image stabilizer (OIS) functions and which is equipped with a plurality of functions for obtaining high-quality images. According to an embodiment, the third camera module may be a global shutter camera or a rolling shutter camera.

According to an embodiment, light elements may include the first LED 241 and the second LED 243. For example, the electronic device 201 may provide auxiliary lighting for the first camera module (e.g., the first camera 231 and the second camera 233), the second camera module (e.g., the third camera 235 and the fourth camera 237), and/or the third camera (e.g., the fifth camera 239) by using the first LED 241 and the second LED 243. For example, when the electronic device 201 captures the user's pupil by using the second camera module (e.g., the third camera 235 and the fourth camera 237), the electronic device 201 may easily detect the user's gaze by using the first LED 241 and the second LED 243 as the auxiliary lighting. For example, the first LED 241 and the second LED 243 may include an infrared (IR) LED having an infrared wavelength. Even in a dark environment or an environment where a plurality of lighting elements emit light that are mixed and incident or reflected, the electronic device 201 may easily detect a subject with a camera module, by using the first LED 241 and the second LED 243 as the auxiliary lighting.

According to an embodiment, the PCB may include the first PCB 251 and the second PCB 253. According to an embodiment, the PCB may be positioned in a temple. For example, the first PCB 251 may be positioned in the first temple member 205. The second PCB 253 may be positioned in the second temple member 207. According to an embodiment, the PCB may include a flexible PCB (FPCB). According to an embodiment, the first PCB 251 and the second PCB 253 may deliver an electrical signal to another component (e.g., a camera module (e.g., the first camera 231 to the fifth camera 239), a display (e.g., the first display 211 and the second display 213), an audio module (e.g., the first speaker 281 and the second speaker 283), and/or a sensor module (not shown)) and another PCB through the FPCB. According to an embodiment, a communication circuit (e.g., the communication module 190 of FIG. 1) of the electronic device 201, a processor (e.g., the processor 120 of FIG. 1), a memory (e.g., the memory 130 of FIG. 1), and/or at least one sensor (e.g., the sensor module 176 of FIG. 1) may be disposed on the first PCB 251 and the second PCB 253. For example, each of the first PCB 251 and the second PCB 253 may be composed of a plurality of PCBs spaced from one another by an interposer.

According to an embodiment, the microphone may include the first microphone 271, the second microphone 273, and/or the third microphone 275. According to an embodiment, the microphone may be positioned on the frame 203 or on the bridge 209. In the embodiment of FIG. 2, the first microphone 271 and the second microphone 273 may be positioned on the frame 203, and the third microphone 275 may be positioned on the bridge 209. According to an embodiment, the first microphone 271, the second microphone 273, and the third microphone 275 may receive a voice input from a user wearing the electronic device 201.

According to an embodiment, the speaker may include the first speaker 281 and/or the second speaker 283. According to an embodiment, the speaker may be positioned in the temple. In the embodiment of FIG. 2, the first speaker 281 may be positioned on the first temple member 205, and the second speaker 283 may be positioned on the second temple member 207. According to an embodiment, the first speaker 281 and the second speaker 283 may provide a sound signal to a user wearing the electronic device 201.

According to an embodiment, the sensor module (not shown) may include at least one of a proximity sensor, an illuminance sensor, an acceleration sensor, a gyro sensor, a touch sensor, or a biometric sensor. The sensor module may detect a physical state (e.g., a posture or a location) of the electronic device 201, an external environment state (e.g., the brightness of an object adjacent to the electronic device 201 or the brightness around the electronic device 201), or a state (e.g., electrocardiogram (ECG) or electro-encephalography (EEG) of a user) of a user wearing the electronic device 201 and then may generate an electrical signal or data value corresponding to the sensed state.

According to an embodiment, the biometric sensor may include an electrode and an analog front end (AFE). For example, the electrode may be provided in each of the first temple member 205 and the second temple member 207. The biometric sensor may obtain the user's biometric signal from a portion where the first temple member 205 and the second temple member 207 come into contact with the user's skin through the electrode. For example, the biometric signal may include ECG or EEG. According to an embodiment, the AFE may be a circuit including an instrumentation amplifier (IA), a base pass filter (BPF), a variable gain amplifier (VGA), and an analog-to-digital (A/D) converter having a successive approximation register (SAR) type. The AFE may convert an analog signal obtained through the electrode into a digital signal and may transmit the digital signal to a processor (e.g., the processor 120 of FIG. 1) of the electronic device 201. For example, the processor of the electronic device 201 may evaluate the activity of the sympathetic nervous system and the parasympathetic nervous system through R-R interval of ECG or spectrum analysis of ECG. The processor of the electronic device 201 may determine that eye fatigue increases as the activity of the sympathetic nervous system increases. As another example, the processor of the electronic device 201 may extract a power value for each frequency band through spectrum analysis of EEG, and may evaluate eye fatigue by using the extracted power value.

According to an embodiment, the battery may include the first battery 291 and the second battery 293. According to an embodiment, the battery may be positioned in the temple. In the embodiment of FIG. 2, the first battery 291 may be positioned on the first temple member 205, and the second battery 293 may be positioned on the second temple member 207. According to an embodiment, the first battery 291 and the second battery 293 may power the electronic device 201. According to an embodiment, the first battery 291 and the second battery 293 may also be charged by an external power source.

Hereinafter, components of an electronic device according to an embodiment will be described with reference to FIG. 3.

Figure 3:
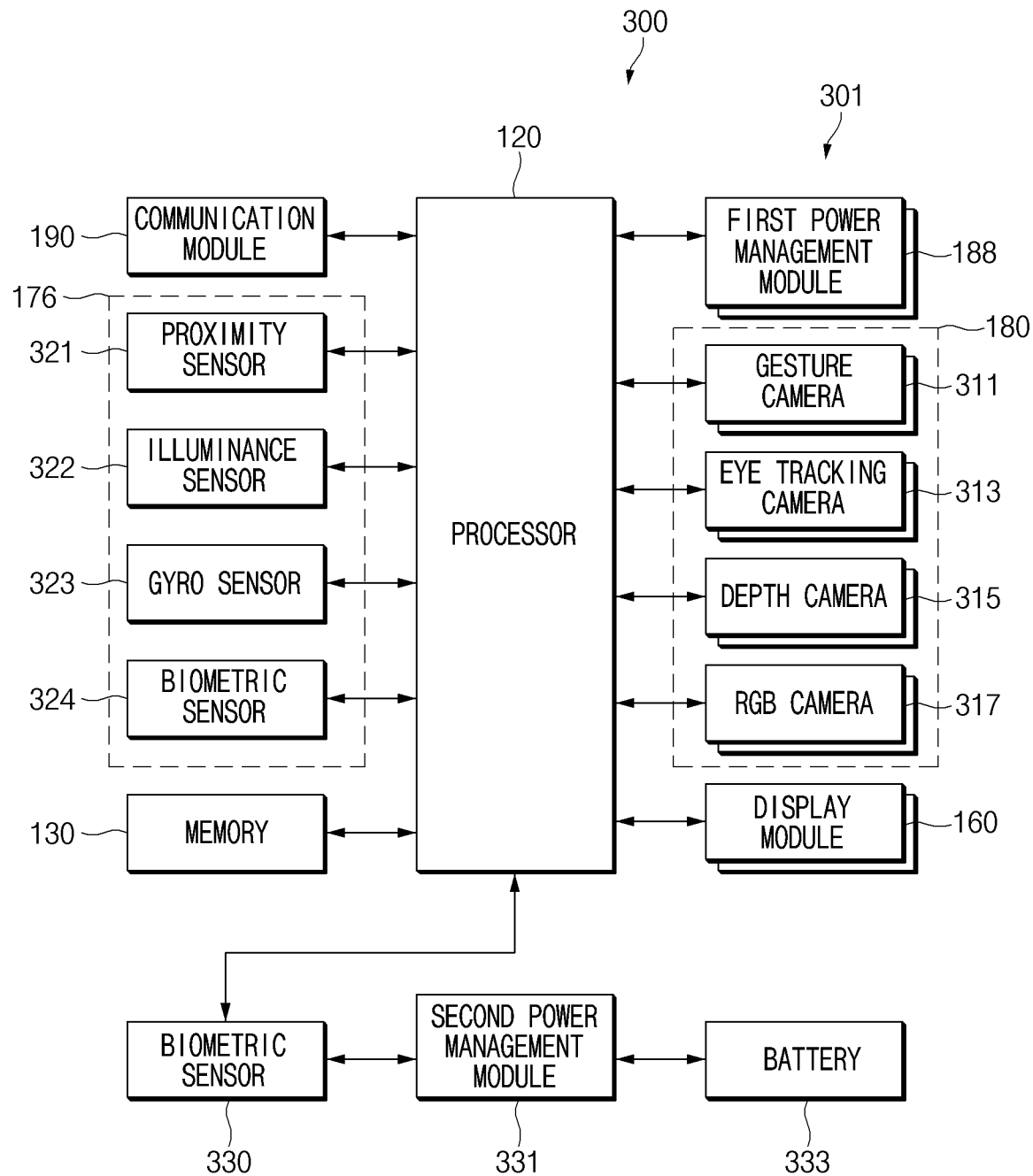
FIG. 3 is a block diagram of an electronic device, according to an embodiment.

FIG. 3 is a block diagram 300 of an electronic device 301, according to an embodiment. According to an embodiment, the electronic device 301 may be the electronic device 101 of FIG. 1 or the electronic device 201 of FIG. 2.

Referring to FIG. 3, the electronic device 301 according to an embodiment may include the processor 120 (e.g., the processor 120 of FIG. 1), the communication module 190 (e.g., the communication module 190 of FIG. 1), the power management module 188 (e.g., the power management module 188 of FIG. 1), the sensor module 176 (e.g., the sensor module 176 of FIG. 1), the camera module 180 (e.g., the camera module 180 of FIG. 1, or the first camera 231 to the fifth camera 239 of FIG. 2), the memory 130 (e.g., the memory 130 of FIG. 1), and/or the display module 160 (e.g., the display module 160 of FIG. 1, or the first display 211 and the second display 213 of FIG. 2). According to an embodiment, the electronic device 201 may be connected to a second power management module 331 through a connection terminal 330 (e.g., USB TYPE-C).

According to an embodiment, the electronic device 301 may be a wearable device capable of being worn on a part of the user's body. For example, the electronic device 301 may be worn on the user's head. In this case, the display module 160 of the electronic device may include an HMD. Hereinafter, it may be assumed that the electronic device 301 to be described is a wearable electronic device that is worn on the user's head and in which the HMD is located in front of the user's eyes when being worn. The direction in which the user faces when the user wears the electronic device 301 may be referred to as a first direction. The direction opposite to the first direction, toward the user, may be referred to as a second direction.

According to an embodiment, the processor 120 may control at least one other component (e.g., hardware or software components) by executing a program (e.g., the program 140 of FIG. 1) stored in the memory 130, and may perform various data processing or operations. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field- Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 120 may provide a user with VR service or AR service. For example, the processor 120 may output virtual space including at least one object through the display module 160. According to an embodiment, content including the virtual space displayed through the display module 160 and at least one object may be referred to as VR content. As another example, the processor 120 may output at least one virtual object through the display module 160 to real space corresponding to the FOV of the user wearing the electronic device 301 such that the at least one virtual object is added to the real space and then the user watches the at least one virtual object. According to an embodiment, content including the real space displayed through the display module 160 and at least one virtual object may be referred to as AR content. For example, the display module 160 may display content, which is generated by the electronic device 301 or received from another electronic device (e.g., the electronic device 102 or 104 of FIG. 1, or the server 108 of FIG. 1) through the communication module 190. According to an embodiment, the processor 120 may store the VR content or the AR content in the memory 130.

According to an embodiment, the display module 160 of the electronic device 301 may include at least one display panel (e.g., a first display panel (e.g., the first display 211) and/or a second display panel (e.g., the second display 213 of FIG. 2)). For example, the display panel may be composed of a transparent element such that the user is capable of perceiving the real space through the display module 160. According to an embodiment, the display module 160 may display at least one virtual object on at least part of the display panel such that the user wearing the electronic device 301 views the virtual object added to the real space. For example, the user's FOV may include an angle or range at which the user is capable of recognizing an object.

According to an embodiment, the sensor module 176 of the electronic device 301 may include a proximity sensor 321, an illuminance sensor 322, a gyro sensor 323, and/or a biometric sensor 324. According to an embodiment, the proximity sensor 321 may detect an object adjacent to the electronic device 301. The illuminance sensor 322 may measure the degree of brightness around the electronic device 301. According to an embodiment, the gyro sensor 323 may detect the posture and location of the electronic device 301. For example, the gyro sensor 323 may detect whether the electronic device 301 is properly worn on the user's head. As another example, the gyro sensor 323 may detect a movement of the electronic device 301 or a user wearing the electronic device 301. According to an embodiment, the biometric sensor 324 may measure the ECG and EEG of the user wearing the electronic device 301.

According to an embodiment, the electronic device 301 may perform wireless communication with another electronic device (e.g., the electronic device 102 or 104 of FIG. 1) through the communication module 190 (e.g., a wireless communication circuit). For example, the electronic device 301 may perform wireless communication with a portable electronic device (e.g., a smartphone). The electronic device 301 may be at least partially controlled by another external electronic device (e.g., a portable electronic device). For example, the electronic device 301 may perform at least one function under the control of another external electronic device.

According to an embodiment, the camera module 180 of the electronic device 301 may include a gesture camera 311 (e.g., the first camera 231 and the second camera 233 of FIG. 2), an eye tracking camera 313 (e.g., the third camera 235 and the fourth camera 237 of FIG. 2), a depth camera 315 (e.g., the first camera 231 and the second camera 233 of FIG. 2), and/or a red-green-blue (RGB) camera 317 (e.g., the fifth camera 239 of FIG. 2).

The gesture camera 311 may detect the user's movement. For example, at least one or more of the gesture cameras 311 may be positioned on the electronic device 301 and may detect the movement of the user's hand within a preset distance. The gesture camera 311 may include a simultaneous localization and mapping camera (SLAM camera) for recognizing information (e.g., a location and/or direction) associated with the surrounding space of the electronic device 301. The gesture recognition area of the gesture camera 311 may be set based on the available shooting range of the gesture camera 311.

According to an embodiment, the eye tracking camera 313 may detect and track the size, location, and movement of the user's pupil. According to an embodiment, the eye tracking camera 313 may include a plurality of cameras (e.g., the third camera 235 and the fourth camera 237 of FIG. 2) corresponding to the user's left and right eyes, respectively. According to an embodiment, the processor 120 may determine the user's eye condition (e.g., fatigue) or gaze direction by using the eye tracking camera 313. According to an embodiment, the processor 120 may determine the degree of eye fatigue based on at least one of eye flicker frequency, pupil adjustment speed, the degree of eye dryness, the degree of eye redness, or the degree of pupil tremor.

According to an embodiment, the depth camera 315 may measure the distance to an object positioned in front of the electronic device 301. The depth camera 315 may include a time of flight (TOF) camera and/or a depth camera. According to an embodiment, the electronic device 301 may recognize one of the objects located in the gaze direction of the user by using the eye tracking camera 313 and may calculate depth, that is, a distance to the object, through the depth camera or may measure a distance to the object through the TOF camera. According to an embodiment, the RGB camera 317 may detect color-related information of an object and information about a distance from the object.

According to an embodiment, the gesture camera 311, the eye tracking camera 313, the depth camera 315, and/or the RGB camera 317 included in the camera module 180 may be included in the electronic device 301; alternatively, some of the gesture camera 311, the eye tracking camera 313, the depth camera 315, and/or the RGB camera 317 may be implemented as an integrated camera. For example, the depth camera 315 and the RGB camera 317 may be implemented as one integrated camera.

According to an embodiment, the gesture camera 311, the depth camera 315, and the RGB camera 317 may be arranged to capture an image in the gaze direction of the user's eyes. The eye tracking camera 313 may be arranged to capture the user's eyes.

The number and location of at least one camera (e.g., the gesture camera 311, the eye tracking camera 313, the depth camera 315, and/or the RGB camera 317) included in the electronic device 301 illustrated in FIG. 3 may not be limited thereto. For example, the number and location of at least one camera may vary based on a characteristic (e.g., shape or size) of the electronic device 301.

According to an embodiment, the power management module (188, 331) may manage power supplied to the electronic device 301. The power management module (188, 331) may include the first power management module 188, which is directly connected to the processor 120 so as to supply power to the processor 120, and the second power management module 331 that supplies power through the connection terminal 330 (e.g., TYPE-C). The second power management module 331 may be functionally connected to a battery 333 so as to manage more power. According to an embodiment, the electronic device 301 may drive at least one camera included in the camera module 180 by using the power supplied from the power management module (188, 331). The electronic device 201 may manage power consumption by adjusting display information provided through the display module 160 based on information obtained by using the at least one camera.

Hereinafter, components and operations of an electronic device according to an embodiment will be described with reference to FIG. 4.

Figure 4:
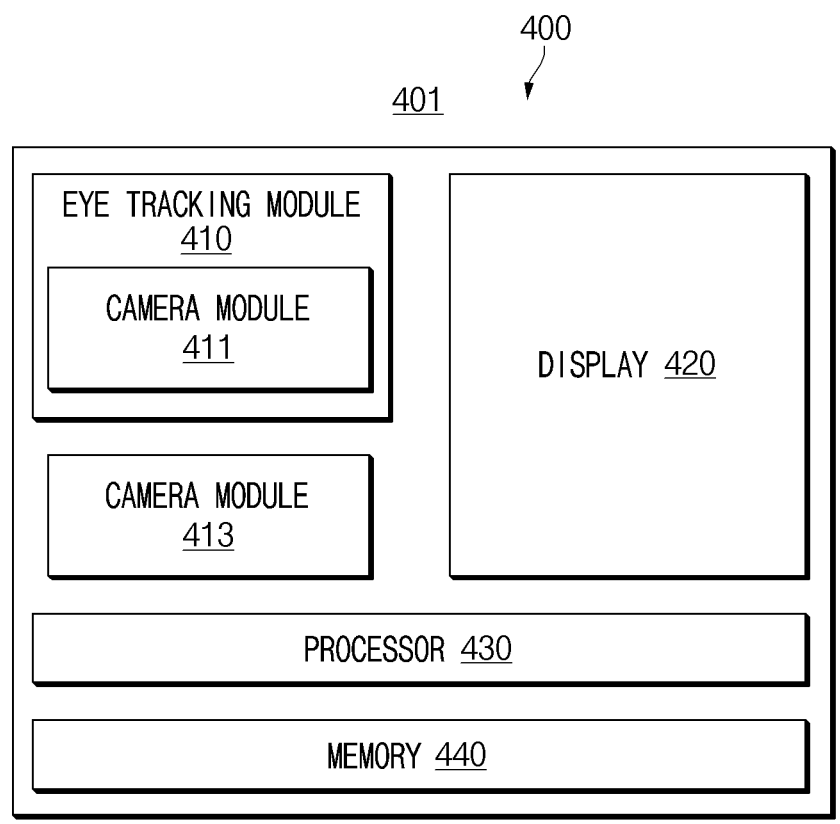
FIG. 4 is a block diagram of the electronic device, according to an embodiment.

FIG. 4 is a block diagram 400 of an electronic device 401, according to an embodiment. According to an embodiment, the electronic device 401 may be the electronic device 101 of FIG. 1, the electronic device 201 of FIG. 2, or the electronic device 301 of FIG. 3. It is assumed that the electronic device 401 described below is a device capable of being worn on the user's head and may be the pair of glasses, for example, as shown in FIG. 2.

Referring to FIG. 4, the electronic device 401 according to an embodiment may include an eye tracking module 410, a display 420 (e.g., the display module 160 of FIGS. 1 and 3, or the first display 211 and the second display 213 of FIG. 2), a processor 430 (e.g., the processor 120 in FIGS. 1 and 3), and a memory 440 (e.g., the memory 130 of FIGS. 1 and 3).

According to an embodiment, the eye tracking module 410 may include a camera module 411 (e.g., the camera module 180 of FIGS. 1 and 3, or the first camera 231 to the fifth camera 239 of FIG. 2). The detailed description of the camera module 411 is duplicative of the description given with reference to FIGS. 1 to 3, and thus the detailed disclosure will be simplified or omitted to avoid redundancy. According to an embodiment, the camera module 411 may capture the eye or pupil of the user wearing the electronic device 401. According to an embodiment, the processor 430 to be described may obtain eye tracking data indicating states of the user's eyes based on an image captured by the camera module 411. According to an embodiment, the processor 430 may obtain the eye tracking data for a specified period.

According to an embodiment, the display 420 may display content. The content may include, for example, VR content or AR content. According to an embodiment, the content may include at least one object. According to an embodiment, the object may include a virtual object. For example, the object may include text or image. Herein, the image may include static images and dynamic images. According to an embodiment, the object may include information in various forms capable of being perceived visually by the user. A detailed description of the display 420 is duplicative of the description given above with reference to FIGS. 1 to 3, and thus the detailed disclosure will be simplified or omitted to avoid redundancy.

According to an embodiment, the user may watch content output through the display 420, and the user may feel eye fatigue due to viewing the content.

According to an embodiment, the processor 430 may be operatively or functionally connected to the camera module 411 and the display 420. According to an embodiment, the processor 430 may determine an eye fatigue level based on the user's eye tracking data obtained by using the camera module 411. According to an embodiment, the processor 430 may control a setting of the display 420 or an output setting of content, which is to be output on the display 420, depending on the determined eye fatigue level.

According to an embodiment, the processor 430 may determine the eye fatigue level based on the eye tracking data. For example, the eye tracking data may include measurement values for a plurality of parameters. According to an embodiment, the plurality of parameters may be associated with eye fatigue and may include information indicating the state or movement of eyes or pupils. For example, the plurality of parameters may include at least one of eye flicker frequency, pupil adjustment speed, the degree of eye dryness, the degree of eye redness, or the degree of pupil tremor.

According to an embodiment, the processor 430 may classify the eye fatigue into a plurality of levels (e.g., level 1 to level n ('n' is a natural number of 2 or more)). According to an embodiment, the eye fatigue level may increase as the eye fatigue increases. According to an embodiment, the processor 430 may determine the eye fatigue level depending on a condition consisting of at least one parameter among the plurality of parameters or a combination of the at least two parameters among the plurality of parameters. According to an embodiment, the condition may include at least one parameter or a combination of at least two parameters, and may include a threshold range or threshold value for each parameter. A method in which the processor 430 determines an eye fatigue level will be described later in detail with reference to FIG. 5.

According to an embodiment, the processor 430 may determine the eye fatigue level by applying a weight for each parameter. According to an embodiment, the processor 430 may identify a weight for each parameter of the plurality of parameters. According to an embodiment, the weight for each parameter may be different for each user. The processor 430 may identify the weight for each parameter based on user identification information. According to an embodiment, the processor 430 may apply a weight for each parameter to at least one parameter.

According to an embodiment, the electronic device 401 may further include a sensor module 413 (e.g., the sensor module 176 of FIGS. 1 and 3). According to an embodiment, the sensor module 413 may include a biometric sensor capable of measuring a biometric signal of the user wearing the electronic device 401. The detailed description of the sensor module 413 or the biometric sensor is duplicative of the description given with reference to FIGS. 1 to 3, and thus the detailed disclosure will be simplified or omitted to avoid redundancy. According to an embodiment, the processor 430 may obtain a biometric signal by using the sensor module 413. For example, the biometric signal may include at least one of ECG and EEG. According to an embodiment, the processor 430 may determine the user's eye fatigue level further based on the biometric signal measured by the sensor module 413. For example, the processor 430 may analyze the ECG or EEG and may use the analysis result to determine the user's eye fatigue level. According to an embodiment, the ECG or EEG may be used as another parameter for determining the eye fatigue level.

According to an embodiment, the processor 430 may determine the eye fatigue level further based on usage history information of the electronic device 401. According to an embodiment, the usage history information of the electronic device 401 may include at least one of the usage time of the electronic device 401, the setting (e.g., illumination level) of the display 420, or the type of application being executed. For example, as the usage time of the electronic device 401 increases, the user's eye fatigue may increase. For example, as the illuminance of the display 420 increases, the user's eye fatigue may increase. For example, if the displayed screen changes frequently or if the executing application (e.g., game application) has a lot of objects moving on the screen, the user's eye fatigue may increase. According to an embodiment, when the processor 430 is not capable of obtaining the user's eye tracking data or biometric signal, the processor 430 may determine the eye fatigue level based on the usage history information of the electronic device 401. The processor 430 may determine the eye fatigue level more accurately by additionally taking into account the usage history information of the electronic device 401 to the user's eye tracking data or biometric signal.

According to an embodiment, the processor 430 may control a setting of the display 420 or an output setting of content, which is to be output on the display 420, depending on the determined eye fatigue level. According to an embodiment, an item related to a setting of the display 420 may include at least one of a scan rate (unit: Hz) or brightness, but is not limited thereto. For example, the processor 430 may change the setting of the display 420 by changing at least one of the scan rate and brightness. According to an embodiment, an item related to an output setting of content to be output on the display 420 may include at least one of the number, sizes, locations, colors, or stereoscopic effect levels of objects output on the display 420. For example, the processor 430 may change the output setting of content to be output on the display 420 by changing at least one of the number, sizes, locations, colors, or stereoscopic effect levels of the objects output on the display 420.

According to an embodiment, the processor 430 may adjust the eye fatigue level based on content, which is to be output, from among content output to the display 420. According to an embodiment, the content to be output may include at least part of content that is not yet output although the output is scheduled from among the content output on the display 420. For example, the content to be output may include content including determined information to be displayed later on the display 420 such as execution of a game displaying a specified screen or playback a video. The processor 430 may predict a change in an eye fatigue level based on the content to be output. The processor 430 may reduce the increase in the actual eye fatigue level by attempting to adjust the eye fatigue level and predicting the change in the eye fatigue level. According to an embodiment, when it is predicted that the eye fatigue level currently determined by the processor 430 is 3, and the eye fatigue level after all pieces of content to be output is completely output is 7. Accordingly, the processor 430 may change the eye fatigue level, which is determined as 3, into 5, and thus may change the setting of the display 420 so as to correspond to level 5. For example, the eye fatigue level determined by the processor 430 after all pieces of content to be output are output may be level 6, not level 7 thus predicted.

According to an embodiment, the memory 440 may store various data used by at least one component (e.g., the processor 430, the camera module 411, or the sensor module 413) of the electronic device 401. For example, data may include software (e.g., a program) and input data or output data for instructions associated with the software. According to an embodiment, the memory 440 may store one or more instructions executable by the processor 430.

Hereinafter, a method for determining an eye fatigue level by an electronic device according to an embodiment will be described with reference to FIG. 5.

Figure 5:
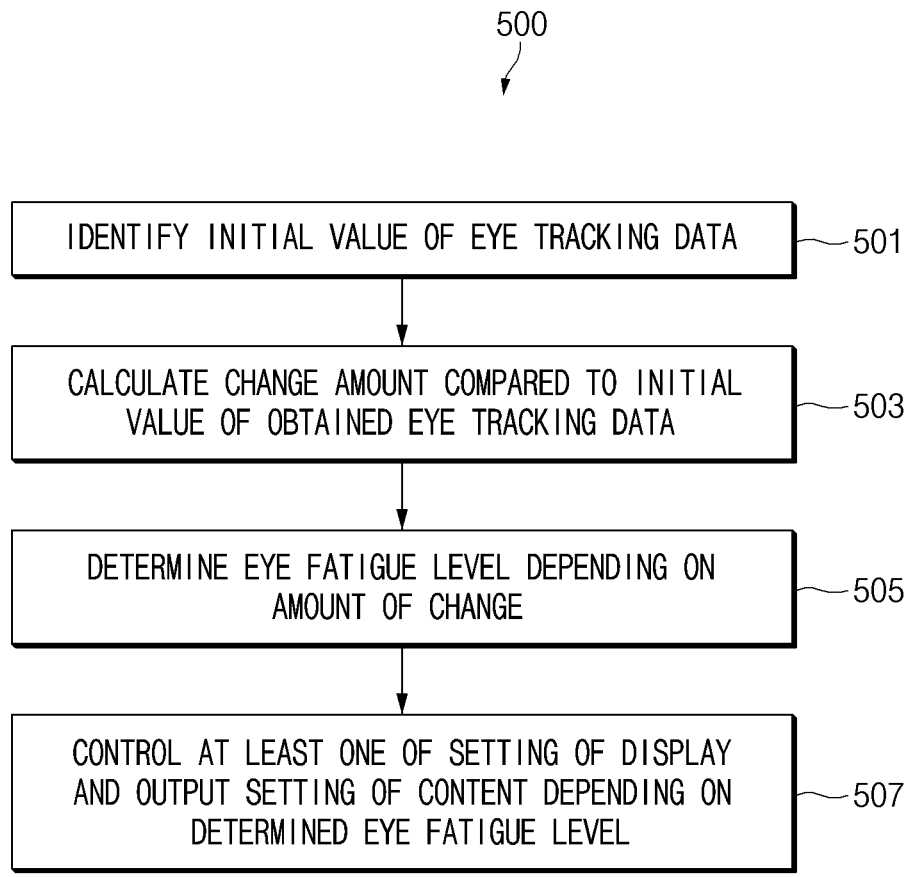
FIG. 5 is a flowchart illustrating an operating method of an electronic device, according to an embodiment.

FIG. 5 is a flowchart 500 illustrating an operating method of an electronic device, according to an embodiment. Operations of an electronic device to be described below may be performed by an electronic device (e.g., the electronic device 401 of FIG. 4) or a processor (e.g., the processor 430 of FIG. 4) of the electronic device according to an embodiment.

In operation 501, the electronic device may identify an initial value of eye tracking data. According to an embodiment, the eye tracking data may be obtained by using a camera module (e.g., the camera module 411 of FIG. 4) of the electronic device. The eye tracking data may include measurement values for a plurality of parameters related to a user's eye fatigue. For example, the plurality of parameters may include at least one of eye flicker frequency, pupil adjustment speed, the degree of eye dryness, the degree of eye redness, or the degree of pupil tremor.

According to an embodiment, an initial value of the eye tracking data may include a measurement value obtained as the electronic device first measures a plurality of parameters after the user wears the electronic device. For example, the initial value of the eye tracking data may include an average value during a specified time period from a point in time when the user wears the electronic device. According to another embodiment, the initial value of the eye tracking data may include a value preset as a value input by the user through an input module (e.g., the input module 150 of FIG. 1) (e.g., a touch screen display) of the electronic device.

According to an embodiment, the initial value of the eye tracking data may include an average value determined based on the user's history information. For example, the user's history information may include information obtained by storing an average value during a specified time period during which the electronic device is worn for each user after the electronic device identifies the user. According to an embodiment, when identifying that a user wears the electronic device, the electronic device may identify the user. The electronic device may set the average value of the identified user as the initial value based on the user's history information. For example, the electronic device may identify the user through biometric authentication.

According to an embodiment, the electronic device may further include a communication module (e.g., the communication module 190 of FIGS. 1 and 3). The electronic device may receive setting information and usage history information of an external electronic device (e.g., the electronic device 102 of FIG. 1, or the electronic device 104 of FIG. 1) from the user's external electronic device (e.g., the electronic device 102 of FIG. 1, the electronic device 104 of FIG. 1, or the server 108) through the communication module. According to an embodiment, the electronic device and the external electronic device may include an electronic device in which the same user information is registered. According to an embodiment, the electronic device may set the initial value of eye tracking data based on setting information and usage history information of the external electronic device.

According to an embodiment, the setting information of the external electronic device may include an initial value of eye tracking data set for the external electronic device. For example, when the initial value of the user's eye tracking data is already set for another electronic device with respect to the same user, the electronic device may determine the initial value of the eye tracking data in the electronic device by using the initial value information set for the other electronic device.

According to an embodiment, the usage history information of the external electronic device may include at least one of usage time of the external electronic device, a setting of a display of the external electronic device, or a list of applications recently executed in the external electronic device. For example, when the user has a history of using the external electronic device before the user employs the wearable electronic device, the electronic device may set the initial value of the eye tracking data in the electronic device based on the usage history information of the external electronic device.

In operation 503, the electronic device may calculate the amount of change compared to the initial value of the obtained eye tracking data. According to an embodiment, the electronic device may obtain eye tracking data at a specified time period. The electronic device may obtain measurement values for a plurality of parameters at a specified period. The measurement values for the plurality of parameters may increase or decrease as the user's eye fatigue increases. According to an embodiment, the electronic device may calculate the amount of change compared to the initial value of the measurement values for a plurality of parameters obtained at a specified period and then may calculate the amount of change compared to the initial value of the eye tracking data.

In operation 505, the electronic device may determine the eye fatigue level depending on the amount of change. For example, the eye fatigue level may include a plurality of levels (e.g., level 1 to level n ('n' is a natural number of 2 or more)). According to an embodiment, the electronic device may determine the eye fatigue level depending on whether the amount of change is greater than or equal to a specified threshold value or whether the amount of change satisfies the specified threshold range for the eye fatigue level. For example, the electronic device may determine the eye fatigue level as the amount of change in eye tracking data increases. The amount of change in eye tracking data may be referred to as the amount of change compared to the initial value of a measurement value for a specific parameter (e.g., eye flicker frequency or pupil adjustment speed) to be described below. For example, the amount of change in eye tracking data may be a decrease or an increase in the measurement value for a parameter. According to an embodiment, as the eye fatigue level is higher, the threshold value or threshold range corresponding to the corresponding level may include a greater value.

According to an embodiment, the electronic device may determine the eye fatigue level depending on a condition consisting of at least one parameter among a plurality of parameters or a combination of at least two parameters.

According to an embodiment, the condition may include at least one parameter or a combination of at least two parameters, and may include a threshold value or threshold range for each parameter. For example, a condition that the eye fatigue level is determined to be level k (V is a natural number between 1 and n) may include a first parameter (e.g., eye flicker frequency) and a second parameter (e.g., pupil adjustment speed), and may include a threshold value (or a threshold range) of the first parameter and a threshold value (or a threshold range) of the second parameter, which correspond to level k. According to an embodiment, as the amount of change compared to the initial value of the measurement value for each parameter is greater than or equal to a threshold value corresponding to each level or satisfies the threshold range corresponding to each level, the electronic device may determine the user's eye fatigue level as the corresponding level. For example, when the amount of change compared to the initial value of the measurement value for the first parameter is greater than the threshold value of the first parameter corresponding to level k, the amount of change satisfies the threshold range of the first parameter corresponding to level k. When the amount of change from the initial value of the measurement value for the second parameter is greater than the threshold value of the second parameter corresponding to level k, the amount of change satisfies a threshold range of the second parameter corresponding to level k. Accordingly, the electronic device may determine the eye fatigue level as level k. In the above-described embodiment, it is described that a condition for determining the eye fatigue level consists of a combination of two parameters. However, an embodiment is not limited thereto.

According to an embodiment, the electronic device may determine the eye fatigue level by applying a weight for each parameter. For example, the electronic device may apply a weight for each parameter by reducing a threshold value corresponding to the eye fatigue level of at least one parameter, but is not limited thereto. According to an embodiment, as the weight for any parameter increases, the electronic device may determine greater eye fatigue for the same amount of change. According to an embodiment, as the weight is high even though the amount of change is small, it may significantly affect the determination of the eye fatigue level. On the other hand, as the weight is low even though the amount of change is greater, it may not significantly affect the determination of an eye fatigue level. According to an embodiment, the eye flicker frequency and pupil adjustment speed among the plurality of parameters may have relatively high weights compared to other parameters.

In operation 505, the electronic device may determine the eye fatigue level further based on a biometric signal obtained by using a biometric sensor (e.g., the sensor module 413 of FIG. 4). According to an embodiment, the biometric signal may include ECG or EEG. According to an embodiment, the electronic device may use ECG or EEG as one of parameters for determining an eye fatigue level. According to an embodiment, the electronic device may apply a weight for each parameter to ECG or EEG. For example, the weights of ECG or EEG may be lower than the weight of a parameter included in the eye tracking data.

In operation 505, the electronic device may determine the eye fatigue level further based on usage history information of the electronic device. According to an embodiment, the usage history information of the electronic device may include at least one of the usage time of the electronic device, the setting (e.g., illumination) of a display (e.g., the display 420 of FIG. 4), or the type of an application being executed. For example, even though the amount of change in the user's eye tracking data or the change in the user's biometric signal is not great, when the usage time of the electronic device is long, the illumination of the display is high, or a lot of screen changes or a lot of movements within a screen are present, the electronic device may determine the user's eye fatigue level so as to be high. According to an embodiment, the electronic device may use the usage history information of the electronic device as one of parameters for determining an eye fatigue level. According to an embodiment, the electronic device may apply a relatively low weight to the usage history information of the electronic device compared to the user's eye tracking data or biometric signal.

In operation 507, the electronic device may control at least one of a setting of a display and an output setting of content depending on the determined eye fatigue level. According to an embodiment, an item related to the setting of the display may include at least one of scan rate and brightness. An item related to the output setting of content may include at least one of the number, sizes, locations, colors, or stereoscopic effect levels of objects output to the display. For example, the electronic device may change at least one of the scan rate or brightness of the display depending on the eye fatigue level. As another example, the electronic device may change at least one of the number, sizes, locations, colors, or stereoscopic effect levels of objects output to the display depending on the eye fatigue level.

For example, as the display is brighter or the scan rate of the display is higher, the user's eye fatigue level may be higher. As the eye fatigue level is determined to be higher than a specific level, the electronic device may lower the brightness of the display or may lower the scan rate of the display.

In another example, as the number of objects output on the display increases or sizes of objects decreases, the user's eye fatigue level may be increased. As the eye fatigue level is determined to be higher than the specific level, the electronic device may reduce the number of objects displayed on the display or may increase sizes of the objects. As another example, when an object is positioned to disrupt user experience or the object has a layout that disturbs the user experience, such as when a main object is located at the edge of a screen and a sub-object is located at the center of the screen, the user's eye fatigue level may increase. As the eye fatigue level is determined to be higher than a specific level, the electronic device may change the locations or arrangement of objects displayed on a display in consideration of user experience. As another example, when the color of the object is not black and white, the user's eye fatigue level may be higher than that in a case of black and white. As the eye fatigue level is determined to be higher than the specific level, the electronic device may change the color of an object displayed to black and white or greyscale. As another example, as a stereoscopic effect level of an object is high, the user's eye fatigue level may increase. As the eye fatigue level is determined to be higher than the specific level, the electronic device may lower the stereoscopic effect level of an object displayed on a display.

According to an embodiment, the electronic device may change only the setting of the display, or may change both the setting of the display and an output setting of content. According to an embodiment, the electronic device may have a plurality of modes depending on whether it is changing the setting of the display or the output setting of content. For example, the mode in which the electronic device changes only the setting of the display may be referred to as a "first mode." The mode in which the electronic device changes both the setting of the display and an output setting of content may be referred to as a "second mode".

According to an embodiment, the electronic device may have various modes depending on an item for changing a setting or the number of items for changing the setting.

Hereinafter, a method in which the electronic device according to an embodiment selects one of a plurality of modes depending on an eye fatigue level will be described with reference to FIG. 6.

Figure 6:
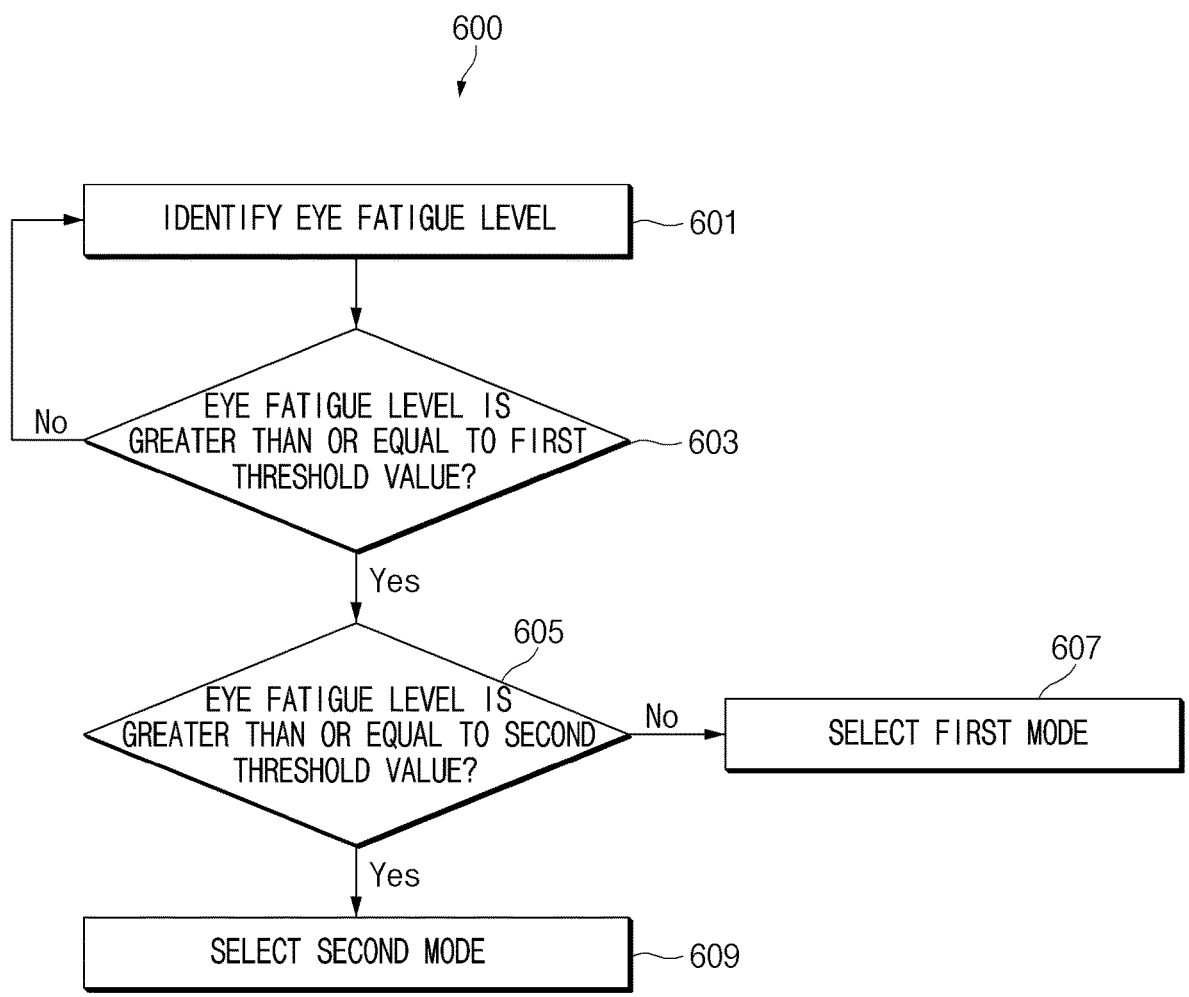
FIG. 6 is a flowchart illustrating an operating method of an electronic device, according to an embodiment.

FIG. 6 is a flowchart 600 illustrating a method of operating an electronic device, according to an embodiment. Operations of an electronic device to be described below may be performed by an electronic device (e.g., the electronic device 401 of FIG. 4) or a processor (e.g., the processor 430 of FIG. 4) of the electronic device according to an embodiment.

In operation 601, the electronic device may identify an eye fatigue level. According to an embodiment, the electronic device may determine the eye fatigue level depending on the process shown in FIG. 5. Alternatively, the electronic device may receive an eye fatigue level from a user via user input. The electronic device may identify the determined eye fatigue level or the input eye fatigue level.

In operation 603, the electronic device may determine whether the identified eye fatigue level is greater than or equal to a first threshold value. For example, assuming that the eye fatigue level is from level 1 to level 10, the first threshold value may be one of 1 to 10. According to an embodiment, when it is determined that the eye fatigue level is greater than or equal to the first threshold value ("Yes"), the electronic device may perform operation 605. When it is determined that the eye fatigue level is less than the first threshold value ("No"), the electronic device may perform operation 601. According to an embodiment, the electronic device may perform operation 601 at a specified period. For example, when it is determined that the eye fatigue level is less than the first threshold value ("No") in operation 603, the electronic device may perform operation 601 after a specified time has elapsed.

In operation 605, the electronic device may determine whether the eye fatigue level is greater than or equal to a second threshold value. For example, assuming that the eye fatigue level is from level 1 to level 10, the second threshold value may be one of 1 to 10. According to an embodiment, the second threshold value may be a value greater than the first threshold value. According to an embodiment, when it is determined that the eye fatigue level is greater than or equal to the second threshold value ("Yes"), the electronic device may perform operation 609. When it is determined that the eye fatigue level is less than the second threshold value ("No"), the electronic device may perform operation 607. According to an embodiment, when it is determined that the eye fatigue level is less than the second threshold value ("No") in operation 605, the eye fatigue level may be greater than the first threshold value and may be less than the second threshold value.

According to an embodiment, when the eye fatigue level is greater than or equal to the first threshold value and is less than the second threshold value, the electronic device may select a first mode (operation 607). When the eye fatigue level is greater than or equal to the second threshold value, the electronic device may select a second mode (operation 609).

In operation 607, the electronic device may select the first mode. According to an embodiment, the first mode may be a mode in which only the setting of the display is changed from among the setting of the display and the output setting of content. For example, as the electronic device selects the first mode, the electronic device may lower the brightness of the display or may lower the scan rate of the display.

In operation 609, the electronic device may select the second mode. According to an embodiment, the second mode may be a mode in which both the setting of the display and the output setting of content are changed. For example, as the electronic device selects the second mode, the electronic device may lower the brightness or scan rate of the display, and may reduce the number of objects or may increase sizes of objects, but is not limited thereto.

According to the above-described embodiment, as it is determined that the eye fatigue level is greater than or equal to the first threshold value, the electronic device may change an item related to the setting of a display. As it is determined that the eye fatigue level is greater than or equal to the second threshold value, the electronic device may change the item related to the output setting of the content in addition to changing the item related to the setting of a display. The electronic device may control the setting of a display or the output setting of content step by step depending on an eye fatigue level. The electronic device may reduce a speed, at which the user's eye fatigue is accumulated, by changing the setting of a display or the output setting of content depending on the eye fatigue level.

Hereinafter, a method of changing, by an electronic device according to an embodiment, a setting of a display or an output setting of content will be described with reference to FIG. 7.

Figure 7:
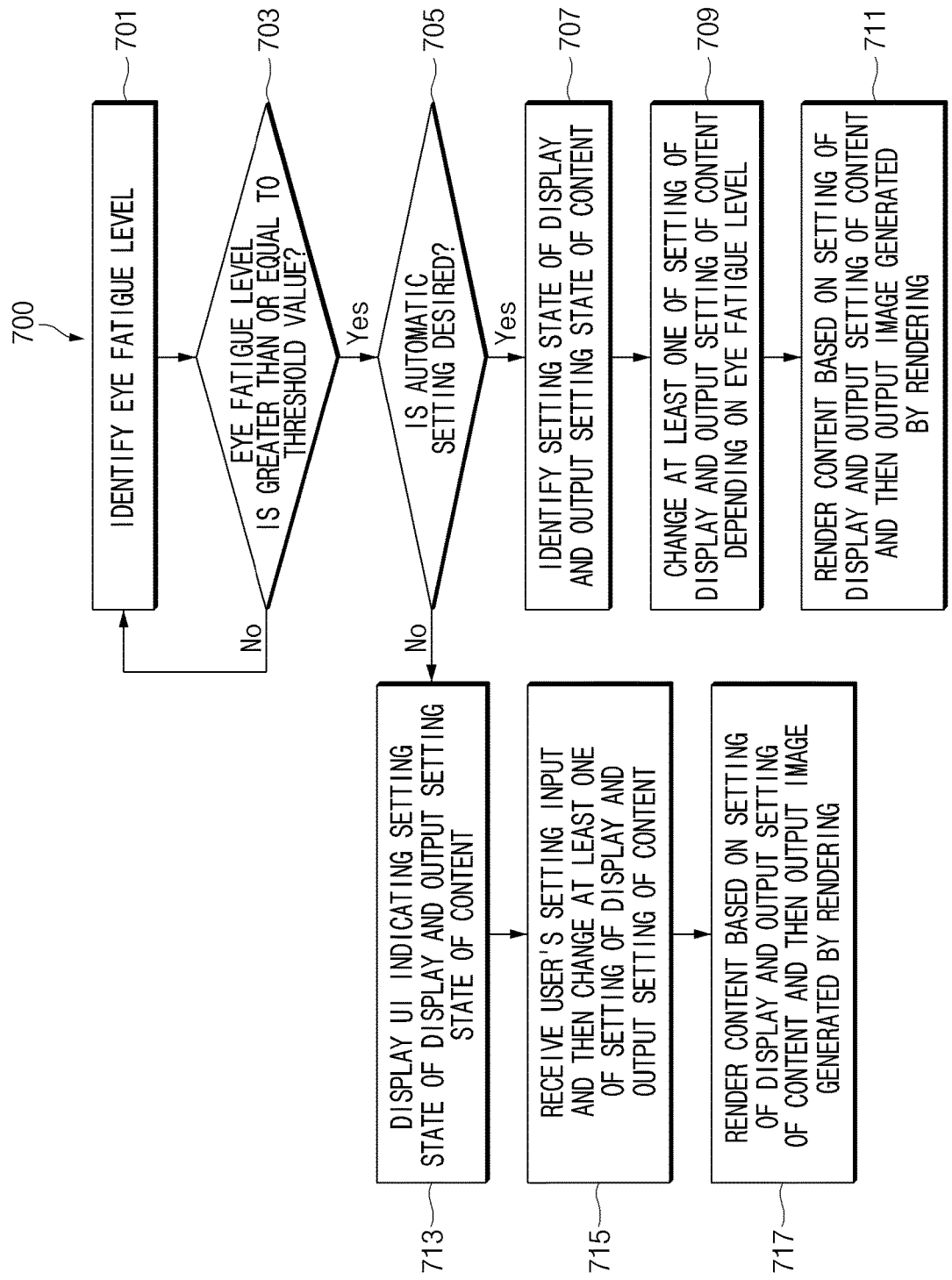
FIG. 7 is a flowchart illustrating an operating method of an electronic device, according to an embodiment.

FIG. 7 is a flowchart 700 illustrating a method of operating an electronic device, according to an embodiment. Operations of an electronic device to be described below may be performed by an electronic device (e.g., the electronic device 401 of FIG. 4) or a processor (e.g., the processor 430 of FIG. 4) of the electronic device according to an embodiment.

In operation 701, the electronic device may identify an eye fatigue level. Operation 701 is the same as operation 601 of FIG. 6, and thus a detailed description thereof is omitted.

In operation 703, the electronic device may determine whether the identified eye fatigue level is greater than or equal to a threshold value. Operation 703 may correspond to operation 603 to operation 605 in FIG. 6. According to an embodiment, when the eye fatigue level is less than a first threshold value, the electronic device may perform operation 701 again. When the eye fatigue level is greater than or equal to the first threshold value, the electronic device may perform operation 705. According to an embodiment, when the eye fatigue level is greater than or equal to the first threshold value and is less than a second threshold value, the electronic device may select a first mode in which only the setting of a display (e.g., the display 420 in FIG. 4) is changed. When the eye fatigue level is greater than or equal to the second threshold value, the electronic device may select a second mode in which both the setting of the display and the output setting of content are changed.

In operation 705, the electronic device may determine whether to automatically set a specified setting value for each selected mode. According to an embodiment, the electronic device may provide a user with a user interface that allows the user to select automatic settings. The user may select the automatic settings through the provided user interface. Depending on receiving the user's selection input that selects automatic settings ("Yes"), the electronic device may perform operation 707 to operation 711. Depending on receiving the user's selection input that does not select automatic settings (selecting a manual settings) ("No"), the electronic device may perform operation 713 to operation 717. In the above-described embodiment, it is described that an electronic device receives a user input and then determines automatic settings, but is not limited thereto. The automatic settings may be determined by identifying a predetermined setting value for the automatic settings.

In operation 707, the electronic device may identify the setting state of a display and the output setting state of content. According to an embodiment, the electronic device may identify the setting state of a display and the output setting state of content at a point in time when operation 701 is performed. For example, the electronic device may identify the brightness of the display and the scan rate of the display at a point in time when operation 701 is performed. For example, the electronic device may identify the number, sizes, locations, colors, or stereoscopic effect levels of objects output to the display at a point in time when operation 701 is performed.

In operation 709, the electronic device may change at least one of the setting of a display and the output setting of content depending on the eye fatigue level. As the electronic device performs operation 703 based on the eye fatigue level identified in operation 701, the electronic device may select one (e.g., the first mode or the second mode) of a plurality of modes. The electronic device may change at least one of a setting of a display or an output setting of content depending on the selected mode. According to an embodiment, the electronic device may change the setting of the display when selecting the first mode. For example, in the first mode, the electronic device may change at least one of brightness of the display or a scan rate of the display to an automatic setting value. According to an embodiment, the electronic device may change the output setting of the content displayed on the display when selecting the second mode. For example, in the second mode, the electronic device may change at least one of the number, sizes, locations, colors, or stereoscopic effect levels of objects output to the display to an automatic setting value.

According to an embodiment, the automatic setting value may include setting values of items related to the setting of the display or the output setting of the content, which are determined depending on the eye fatigue level. The automatic setting value may be stored in a memory (e.g., the memory 440 of FIG. 4) of the electronic device. According to an embodiment, the electronic device may determine the automatic setting value based on history information including the change of the user's eye fatigue level according to a change in a setting item.

In operation 711, the electronic device may render content based on the setting of the display and the output setting of the content and then may output an image generated by the rendering. According to an embodiment, the electronic device may render the content displayed on the display based on the setting of the display and the output setting of the content that are changed to the automatic setting value in operation 709. The electronic device may generate a final image output to the display by rendering the content. The electronic device may output the generated final image to the display.

According to an embodiment, when the automatic setting is not selected, the electronic device may perform operation 713 to operation 717.

In operation 713, the electronic device may display a user interface (UI) indicating the setting state of the display and the output setting state of the content. For example, the electronic device may display the UI including information about the setting state of the display and the output setting state of the content on the display at a point in time when operation 701 is performed. For example, the user interface may include a current setting value and at least one component capable of changing a setting value for each item with respect to items related to the setting of the display or the output setting of the content. The electronic device may allow the user to directly change the setting of the display or the output setting of the content through the user interface. According to an embodiment, as the electronic device selects the first mode, the electronic device may provide the UI including only an item related to the setting of the display. As the electronic device selects the second mode, the electronic device may provide the UI including both an item related to the setting of the display and an item related to the output setting of the content.

In operation 715, the electronic device may receive the user's setting input and then may change at least one of the setting of the display and the output setting of the content. For example, the electronic device may receive the user's setting input for changing at least one setting value of items related to the setting of the display and the output setting of the content through the UI. The electronic device may change at least one of the setting of the display and the output setting of the content based on the received setting input of a user. For example, the electronic device may change at least one of the setting of the display and the output setting of the content by changing a current setting value for each item output through the UI to a setting value entered by the user.

In operation 717, the electronic device may render content based on the setting of the display and the output setting of the content and then may output an image generated by rendering. According to an embodiment, the electronic device may render the content displayed on the display based on the setting of the display and the output setting of the content that are changed to the setting value entered by the user in operation 715. The electronic device may generate the final image output to the display by rendering the content and then may output the generated final image to the display.

Hereinafter, a relationship between a scan rate of a display and eye fatigue and a method in which an electronic device according to an embodiment changes the scan rate of the display depending on an eye fatigue level will be described with reference to FIG. 8.

Figure 8:
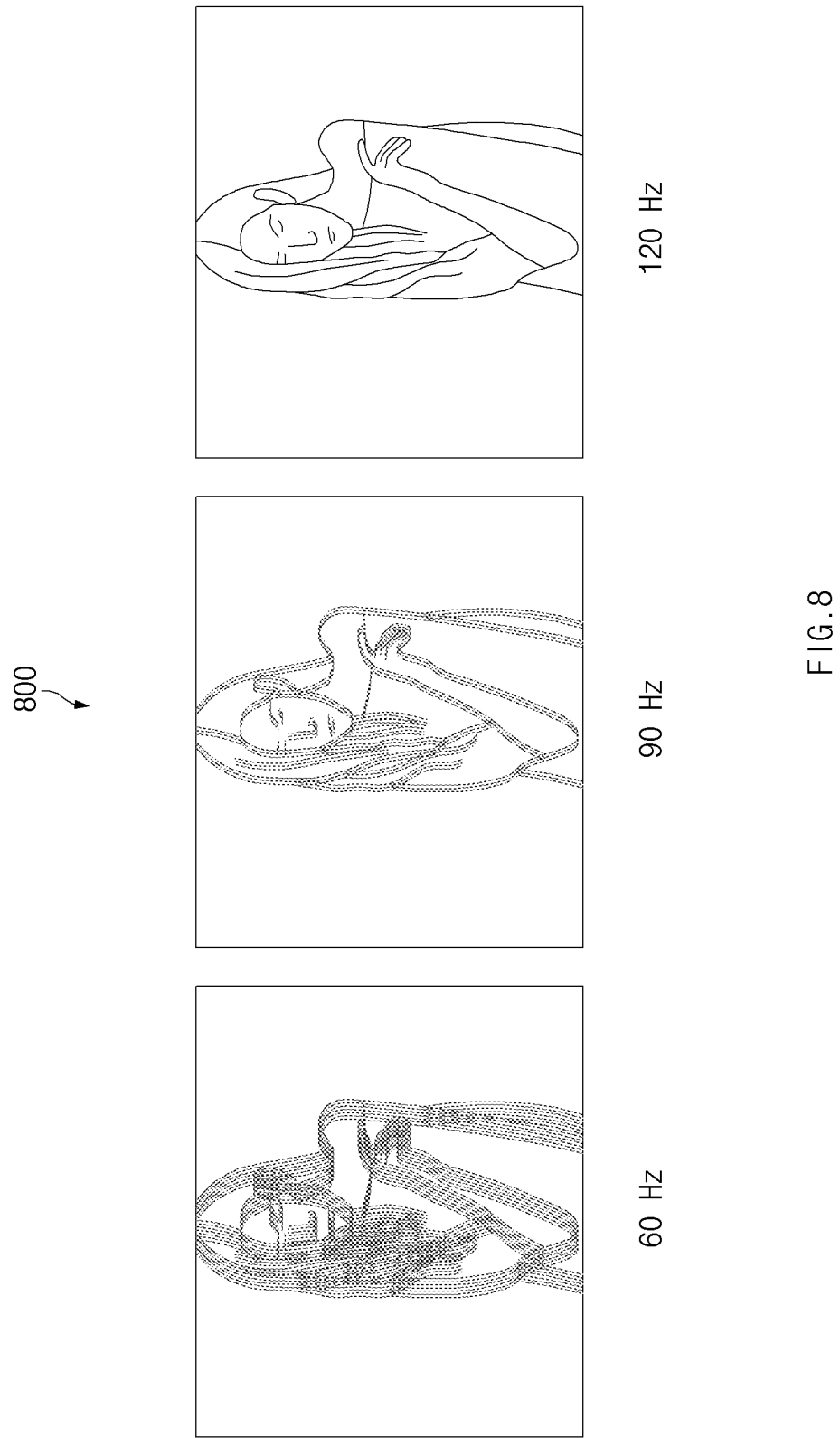
FIG. 8 is a diagram illustrating an example of changing a display setting of an electronic device, according to an embodiment.

FIG. 8 is a diagram 800 illustrating an example of changing a display setting of an electronic device, according to an embodiment. Operations of an electronic device to be described below may be performed by an electronic device (e.g., the electronic device 401 of FIG. 4) or a processor (e.g., the processor 430 of FIG. 4) of the electronic device according to an embodiment.

According to an embodiment, the scan rate of a display (e.g., the display 420 of FIG. 4) may refer to the number of times that the display outputs screens per second or the number of screens output by the display per second. The unit of the scan rate of the display may be is Hertz (Hz). According to an embodiment, the scan rate may also be referred to as "screen refresh rate." According to an embodiment, as the screen is refreshed, the display may flicker.

Referring to FIG. 8, motion blur effect may appear more strongly as the scan rate of the display is lower. For example, as the scan rate decreases to 120 Hz, 90 Hz, and 60 Hz, the motion blur effect may become more prominent. According to an embodiment, the motion blur may refer to a graphic effect in which afterimages occur when objects on the screen move. For example, the motion blur effect may occur when the user moves while wearing an electronic device or when changing his/her gaze. According to an embodiment, when the motion blur effect occurs prominently by a specific level or higher, the user may perceive the flicker of the screen, and thus the user may feel eye fatigue. For example, when the scan rate of the display is greater than 90 Hz, the user may not perceive the flicker.

According to an embodiment, the electronic device may increase the scan rate of the display, thereby reducing the motion blur effect and the user's eye fatigue. According to an embodiment, as it is determined that the user's eye fatigue level is greater than a specific level, the electronic device may reduce the speed at which the user's eye fatigue is accumulated by increasing the scan rate of the display. For example, the electronic device may set the scan rate of the display to 90 Hz or higher such that the user may feel less eye fatigue.

According to an embodiment, as the scan rate of the display is high, the battery consumption may increase. For example, the electronic device may determine the scan rate of the display in consideration of the battery consumption and the user's eye fatigue level.

Hereinafter, a relationship between the number or sizes of objects and eye fatigue, and a method in which the electronic device according to an embodiment changes the number or sizes of objects output to the display depending on an eye fatigue level will be described with reference to FIG. 9.

Figure 9:
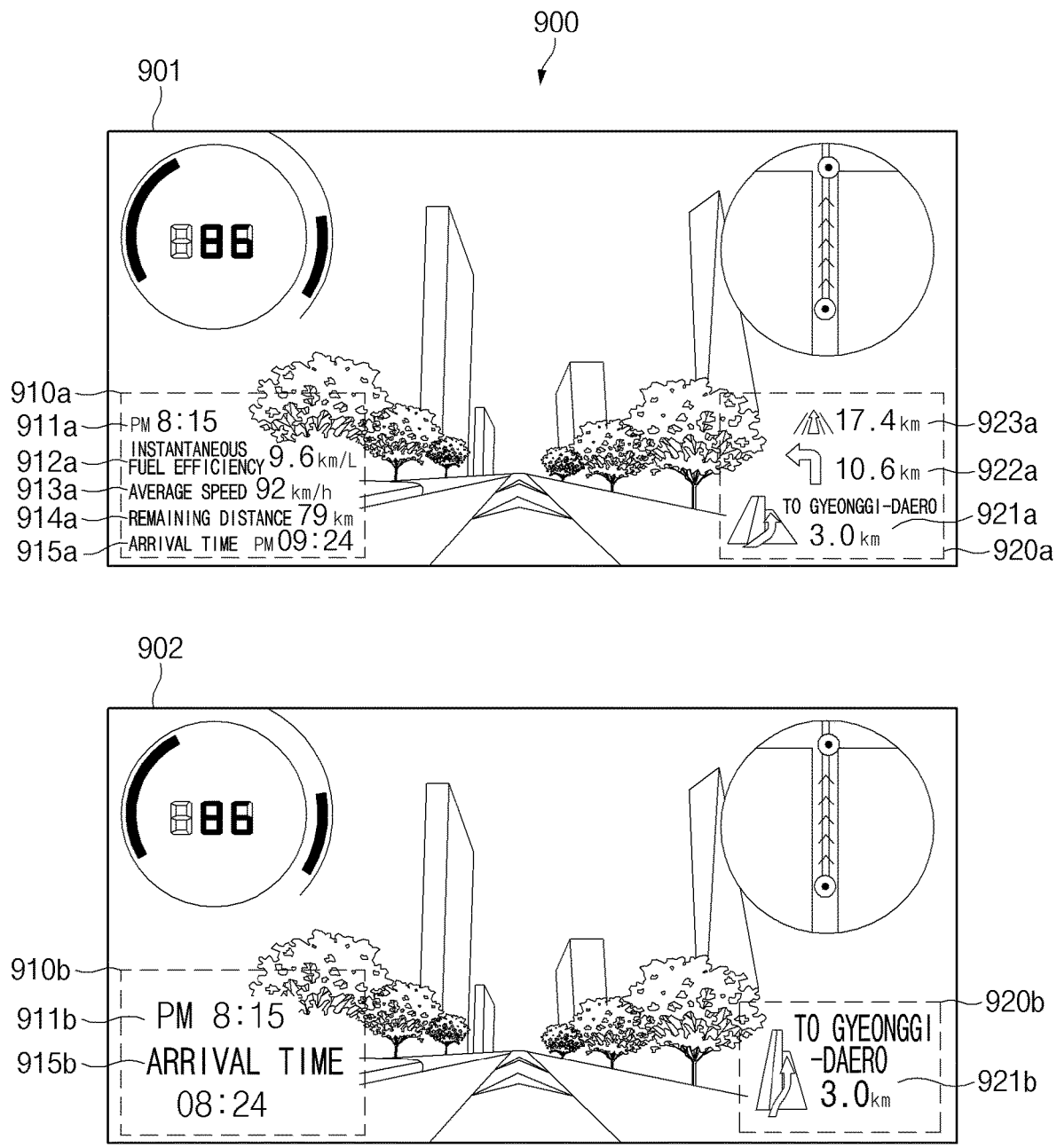
FIG. 9 is a diagram illustrating an example of changing an output setting of content of an electronic device, according to an embodiment.

FIG. 9 is a diagram 900 illustrating an example of changing an output setting of content of an electronic device, according to an embodiment. Operations of an electronic device to be described below may be performed by an electronic device (e.g., the electronic device 401 of FIG. 4) or a processor (e.g., the processor 430 of FIG. 4) of the electronic device according to an embodiment.

A first screen 901 and a second screen 902 of FIG. 9 show screens displayed on a display (e.g., the display 420 of FIG. 4) of the electronic device, and indicate the same content (e.g., navigation content).

Referring to the first screen 901, the electronic device may display a first object 911a, a second object 912a, a third object 913a, a fourth object 914a, and a fifth object 915a in a first area 910a of the display. For example, the first object 911a may be an object including current time information; the second object 912a may be an object including instantaneous fuel efficiency information; the third object 913a may be an object including average speed information; the fourth object 914a may be an object including remaining distance information; and, the fifth object 915a may be an object including arrival time information. The electronic device may display a sixth object 921a, a seventh object 922a, and an eighth object 923a in a second area 920a of the display. For example, the sixth object 921a, the seventh object 922a, and the eighth object 923a may be objects including the following path information. The sixth object 921a may include path information immediately following a current path; the seventh object 922a may include path information following the path included in the sixth object 921a; and, the eighth object 923a may include path information following the path included in the seventh object 922a.

According to an embodiment, the electronic device may change the number or sizes of objects displayed on the display depending on the eye fatigue level. Hereinafter, it is assumed that the eye fatigue level identified by the electronic device in the second screen 902 is higher than the eye fatigue level in the first screen 901. According to an embodiment, as the eye fatigue level increases, the electronic device may reduce the number of objects displayed on the display and may increase sizes of the objects displayed on the display.

Referring to the second screen 902, the electronic device may display a first object 911b and a fifth object 915b in a first area 910b. According to an embodiment, the electronic device may reduce the number of objects displayed in the first area 910b from five to two. According to an embodiment, the electronic device may determine the number of objects to be output on the display in consideration of the priority between the plurality of objects. For example, the electronic device may select the first object 911b and the fifth object 915b, which are two objects having the highest priority among a plurality of objects displayed in the first area 910b, and then may display the first object 911b and the fifth object 915b in the first area 910b. In the same way, the electronic device may display only a sixth object 921b in a second area 920b. According to an embodiment, the electronic device may reduce the number of objects displayed in the second area 920b from three to one. The electronic device may select the sixth object 921b, which is an object having the highest priority among a plurality of objects displayed in the second area 920b, and then may display the sixth object 921b in the second area 920b.

According to an embodiment, the electronic device may increase the size of the object displayed in the first area 910b or the second area 920b. According to an embodiment, the electronic device may reduce the amount of information thus provided by reducing the number of objects output on the display and increasing sizes of output objects, thereby providing improved visibility. The electronic device may reduce the amount of information provided on a screen and may increases the visibility of information, thereby reducing a speed at which the user's eye fatigue is accumulated.

Hereinafter, a method, in which an electronic device according to an embodiment changes an activated FOV depending on a user's eye fatigue level, will be described with reference to FIG. 10.

Figure 10:
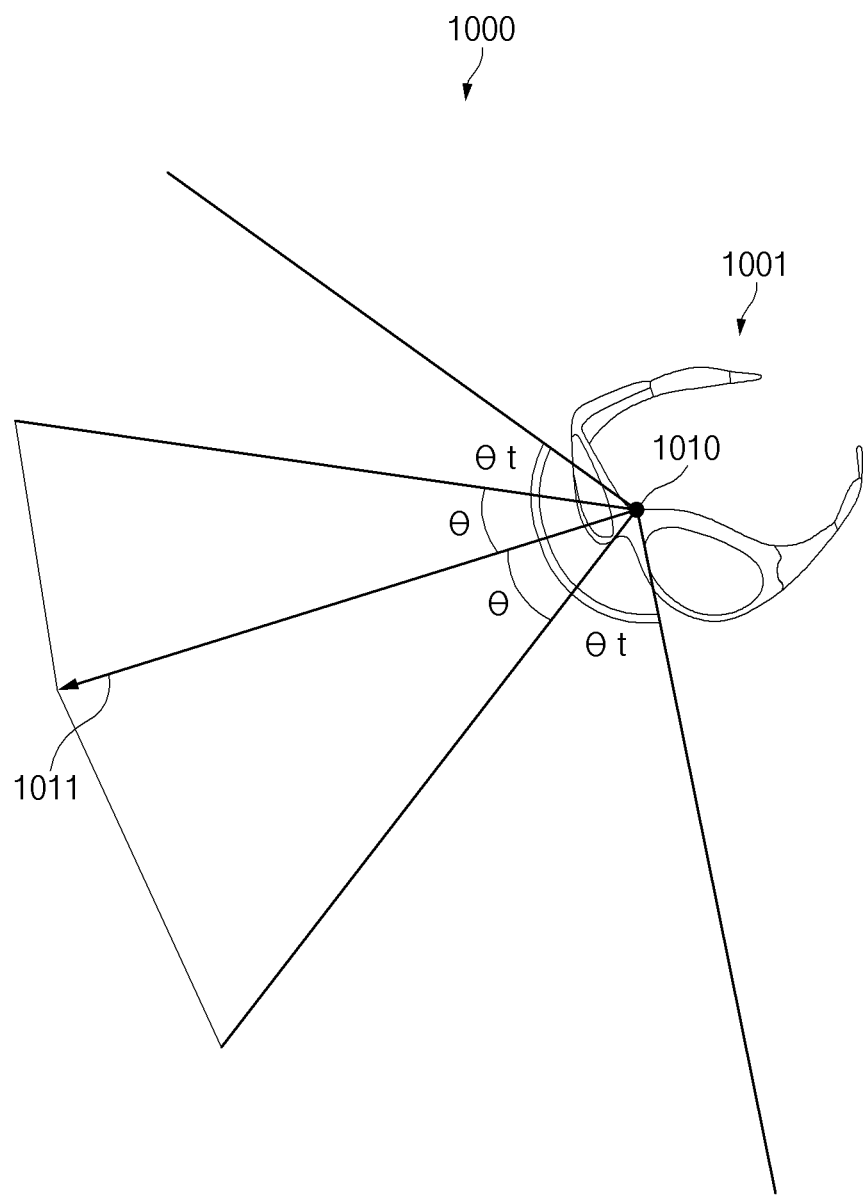
FIG. 10 is a diagram for describing an operation of changing an FOV of an electronic device, according to an embodiment.

FIG. 10 is a diagram 1000 for describing an operation of changing an FOV of an electronic device, according to an embodiment. An electronic device 1001 according to an embodiment shown in FIG. 10 may be the electronic device 401 of FIG. 4. Operations of the electronic device 1001 described below may be performed by the processor 430 of the electronic device 401.

According to an embodiment, a camera module (e.g., the camera module 411 of FIG. 4) of the electronic device 1001 may recognize a specific range based on a user's gaze direction 1011 when user wears the electronic device 1001. The range may be referred to as a field of view (FOV). According to an embodiment, the electronic device 1001 may determine the gaze direction 1011 of the user by using a camera (e.g., the eye tracking camera 313 in FIG. 3) that detects and tracks the location or movement of the user's eye or pupil. According to an embodiment, the electronic device 1001 may determine the gaze direction 1011 of the user based on a reference point 1010. According to an embodiment, the reference point 1010 may be at least part of the electronic device 1001 corresponding to a center of both eyes of the user. For example, when the electronic device 1001 (e.g., the electronic device 201 of FIG. 2) is a pair of glasses, the reference point 1010 may include a center of a bridge (e.g., the bridge 209 of FIG. 2) connecting a first portion of a frame (e.g., the frame 203 in FIG. 2), which surrounds a display (e.g., the first display 211) corresponding to a right eye, and a second portion of the frame (e.g., the frame 203 in FIG. 2) surrounding a display (e.g., the second display 213) corresponding to a left eye.

According to an embodiment, the FOV recognized by the camera module of the electronic device 1001 may include a range that is horizontally spread by an arbitrary angle θ based on the gaze direction 1011 ($0 \leq \theta \leq \theta_t$). For example, $\theta_t$ may mean the maximum angle corresponding to the maximum FOV recognizable by a camera module.

According to an embodiment, the electronic device may recognize objects within the FOV recognized by the camera module. According to an embodiment, objects within the FOV recognized by the camera module may include real objects. According to an embodiment, the electronic device may provide information associated with the real object by overlapping a virtual object and the real object located within the FOV and displaying the overlapped result on a display. According to an embodiment, even though there is a virtual object mapped onto the actual object located out of FOV, the electronic device may omit the display of the virtual object or may display an alternative object.

According to an embodiment, as an eye fatigue level increases, the electronic device may reduce the FOV recognized by the camera module. According to an embodiment, as the FOV decreases, the number of objects located within the FOV may decrease. According to an embodiment, the electronic device displays a virtual object while the virtual object overlaps only an object located within the FOV. Accordingly, the amount of information displayed through a display may be reduced as the FOV decreases. As the eye fatigue level increases, the electronic device may reduce the FOV. Accordingly, the electronic device may reduce an amount of information provided to the user and may reduce the speed at which the user's eye fatigue is accumulated.

In the above-described embodiment, it is described that the electronic device reduces the FOV recognized by the camera module as the eye fatigue level increases, but an embodiment is not limited thereto. According to an embodiment, the electronic device may display information (e.g., a virtual object) about a specified FOV among FOVs recognized by the camera module. As the eye fatigue level increases, the electronic device may decrease a range of a specified FOV for displaying the information.

Hereinafter, a method in which an electronic device according to an embodiment constructs a screen depending on a user's eye fatigue level and a method in which an electronic device changes a constructed screen depending on a user interaction will be described with reference to FIG. 11.

Figure 11:
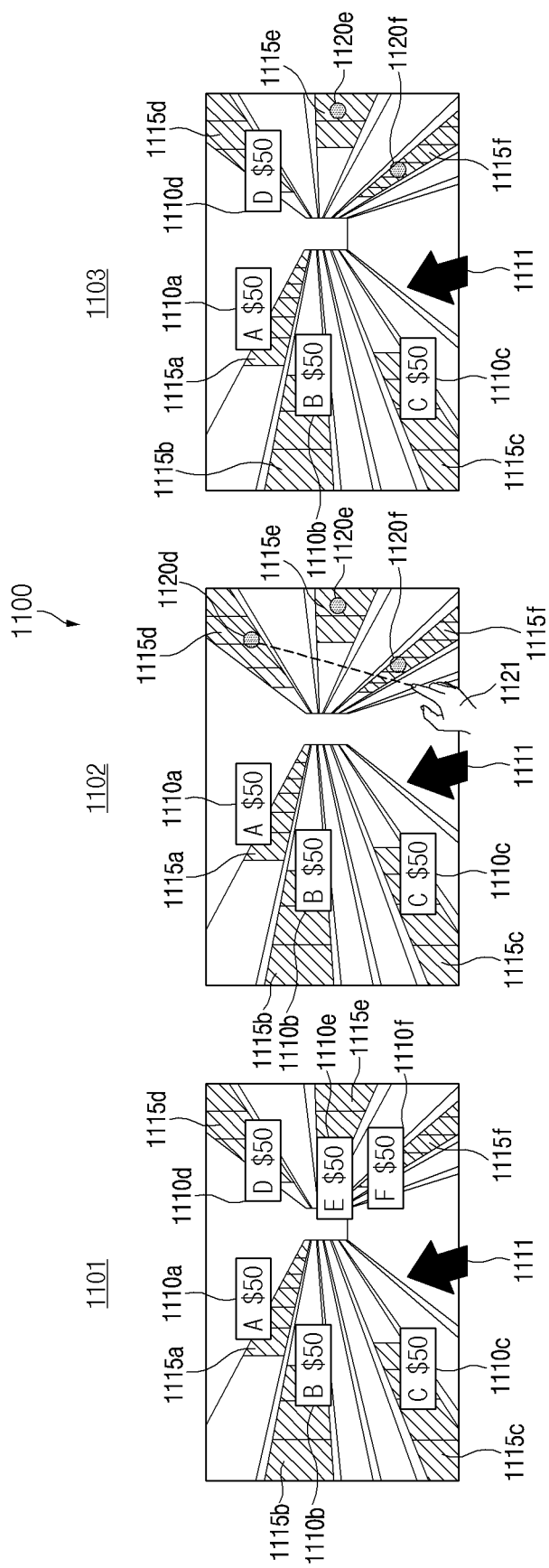
FIG. 11 is a diagram illustrating a screen displayed on a display as an electronic device changes a FOV, according to an embodiment.

FIG. 11 is a diagram 1100 illustrating a screen displayed on a display as an electronic device changes a FOV, according to an embodiment. Operations of an electronic device to be described below may be performed by the electronic device 1001 of FIG. 10 (e.g., the electronic device 401 of FIG. 4) or a processor (e.g., the processor 430 of FIG. 4) of the electronic device 1001. FIG. 11 illustrates screens displayed on a display (e.g., the display 420 of FIG. 4) of an electronic device.

In a first state 1101, the electronic device may identify an eye fatigue level and may set a first FOV depending on the identified eye fatigue level. For example, the first FOV may include a range horizontally spread by $\theta_1$ based on a user's gaze direction 1111. The electronic device may recognize first objects 1115*a*, 1115*b*, 1115*c*, 1115*d*, 1115*e*, and 1115*f*, which are positioned within the first FOV. For example, the first objects 1115*a*, 1115*b*, 1115*c*, 1115*d*, 1115*e*, and 1115*f* may include real objects present outside the electronic device. The electronic device may identify the first objects 1115*a*, 1115*b*, 1115*c*, 1115*d*, 1115*e*, and 1115*f*. Then, the electronic device may overlap second objects 1110*a*, 1110*b*, 1110*c*, 1110*d*, 1110*e*, and 1110*f*, which are mapped onto the first object 1115*a*, 1115*b*, 1115*c*, 1115*d*, 1115*e*, and 1115*f*, with the first object 1115*a*, 1115*b*, 1115*c*, 1115*d*, 1115*e*, and 1115*f* and then may display the overlapped result. According to an embodiment, the second objects 1110*a*, 1110*b*, 1110*c*, 1110*d*, 1110*e*, and 1110*f* may each be a virtual object, and may include information associated with the first objects 1115*a*, 1115*b*, 1115*c*, 1115*d*, 1115*e*, and 1115*f*. For example, when the first objects 1115*a*, 1115*b*, 1115*c*, 1115*d*, 1115*e*, and 1115*f* are products for sale, the second objects 1110*a*, 1110*b*, 1110*c*, 1110*d*, 1110*e*, and 1110*f* may include price information.

In a second state 1102, the electronic device may identify an eye fatigue level, and may set a second FOV depending on the identified eye fatigue level. Hereinafter, it is assumed that the eye fatigue level identified in the second state 1102 is higher than the eye fatigue level identified in the first state 1101. For example, the second FOV may include a range horizontally spread by $\theta_2$ based on the user's gaze direction 1111. According to an embodiment, as the eye fatigue level increases, the electronic device may decrease the FOV, and thus $\theta_2$ may be smaller than $\theta_1$. The electronic device may recognize the first objects 1115*a*, 1115*b*, and 1115*c*, which are positioned within the second FOV. The electronic device may identify the first objects 1115*a*, 1115*b*, and 1115*c*. Then, the electronic device may overlap the second objects 1110*a*, 1110*b*, and 1110*c*, which are mapped onto the first object 1115*a*, 1115*b*, and 1115*c*, with the first object 1115*a*, 1115*b*, and 1115*c* and then may display the overlapped result. The electronic device may identify the third objects 1115*d*, 1115*e*, and 1115*f* positioned out of the second FOV. The electronic device may overlap fifth objects 1120*d*, 1120*e*, and 1120*f*, onto which an operation of outputting a fourth object (e.g., 1110*d*) mapped onto the third objects 1115*d*, 1115*e*, and 1115*f* is mapped, with the first objects 1115*a*, 1115*b*, and 1115*c* and then may display the overlapped result. According to an embodiment, the fourth object may be a virtual object and may include information associated with the third objects 1115*d*, 1115*e*, and 1115*f*. According to an embodiment, the fifth objects may include virtual objects indicating that information (e.g., the fourth object) is capable of being displayed by a user interaction without directly displaying information (e.g., the fourth object). According to an embodiment, the operation of outputting the fourth object (e.g., 1110*d*) may be mapped onto the fifth objects 1120*d*, 1120*e*, and 1120*f*. The electronic device may output the fourth object 1110*d* as the electronic device receives an input for selecting the fifth object 1120*d*.

According to an embodiment, the electronic device may recognize a pointing object 1121 for pointing to an object output on a screen and a direction, in which the pointing object 1121 points, by using a camera module (e.g., the camera module 411 in FIG. 4). The electronic device may select at least one object based on a direction pointed by the pointing object 1121. For example, the electronic device may select the fifth object (e.g., 1120*d*) based on the direction in which the pointing object 1121 points. The electronic device may receive a user input for selecting the fifth object (e.g., 1120*d*). For example, the user input for selecting the fifth object may include a gesture input such as a gesture pointing to the fifth object by using the pointing object 1121.

In a third state 1103, the electronic device may output the fourth object 1110*d* as the electronic device receives a user input for selecting the fifth object (e.g., 1120*d*). According to an embodiment, the electronic device may selectively display information by an additional user interaction without displaying information associated with the third objects 1115*d*, 1115*e*, and 1115*f* positioned out of the second FOV.

Hereinafter, a method in which an electronic device according to an embodiment manages data associated with eye fatigue will be described with reference to FIG. 12.

Figure 12:
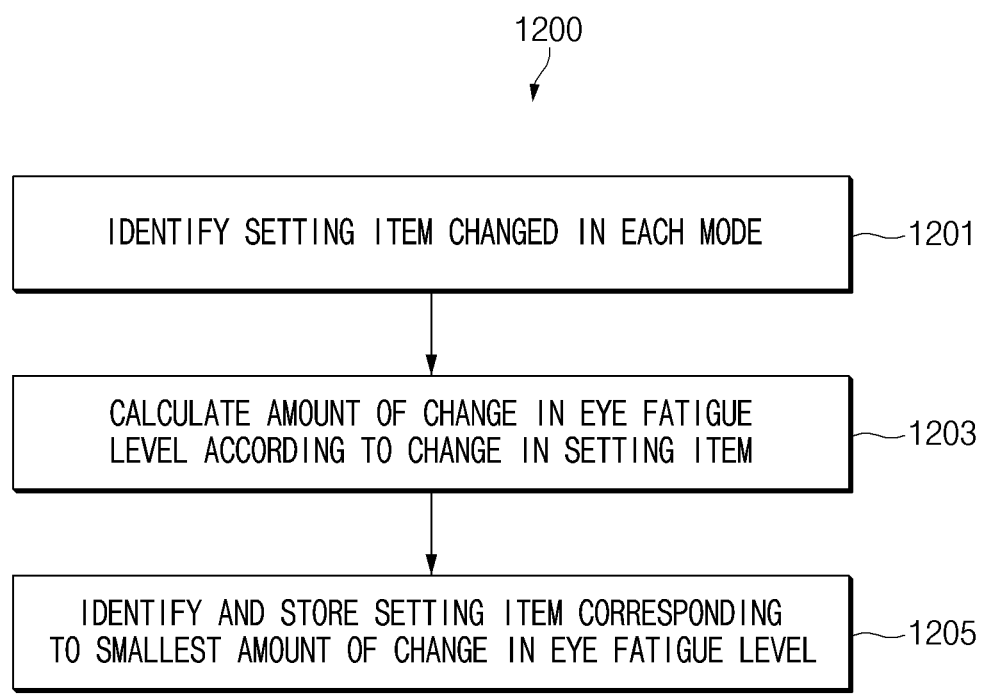
FIG. 12 is a flowchart illustrating an operating method of an electronic device, according to an embodiment.

FIG. 12 is a flowchart 1200 illustrating an operating method of an electronic device, according to an embodiment. Operations of an electronic device to be described below may be performed by an electronic device (e.g., the electronic device 401 of FIG. 4) or a processor (e.g., the processor 430 of FIG. 4) of the electronic device according to an embodiment.

In operation 1201, the electronic device may identify a setting item that is changed in each mode. According to an embodiment, the electronic device may have a plurality of modes for changing at least one of a setting of a display or an output setting of content depending on an eye fatigue level. For example, a setting item related to the setting of the display may include at least one of brightness and scan rate of the display. A setting item related to the output setting of the content may include at least one of the number, sizes, locations, colors, or stereoscopic effect levels of objects output to the display. According to an embodiment, the setting item changed by the electronic device may be different for each mode. According to an embodiment, the electronic device may identify a setting item to be changed in each mode and a method in which a setting is changed for each item (e.g., the amount of change in a setting value for each item). For example, in a first mode, the electronic device may store a history of reducing the brightness of the display from eight to five in a memory (e.g., the memory 440 in FIG. 4).

In operation 1203, the electronic device may calculate the amount of change in the eye fatigue level according to a change in the setting item. The electronic device may calculate the amount of change in the eye fatigue level according to the change in the setting item by comparing the eye fatigue level, which is identified before the setting item is changed, with the eye fatigue level identified after the setting item is changed.

According to an embodiment, the eye fatigue level may increase in proportion to the usage time of the electronic device or the amount of content viewed by the user. For example, as compared to the usage time of the electronic device, the electronic device may reduce the speed, at which the eye fatigue level increases, by changing the setting item. For example, when the electronic device maintains an existing setting state, the eye fatigue level may increase by 3 after a specific time has elapsed. However, as the electronic device changes the setting state, the eye fatigue level identified after the same time has elapsed may increase by 1. According to an embodiment, as the change in the eye fatigue level is small, the change in the setting item is effective in reducing the user's eye fatigue.

According to an embodiment, together with change information including the changed setting item and the amount of change in a setting value, the electronic device may store the predicted amount of change in the eye fatigue level corresponding to the change information in the memory.

In operation 1205, the electronic device may identify and store a setting item corresponding to the smallest amount of change in the eye fatigue level. According to an embodiment, the electronic device may identify change information corresponding to the smallest amount of change in the eye fatigue level among the stored change amount information of the eye fatigue level. The electronic device may separately store the identified change information (e.g., the changed setting item and the amount of change in a setting value) in a user database of the electronic device.

According to an embodiment, the user database may store an eye fatigue reducing method optimized for the user identified by the electronic device. According to an embodiment, the electronic device may change a setting item changed depending on the eye fatigue level and a setting value of the setting item based on data stored in the user database, thereby applying the eye fatigue reducing method optimized for the user.

According to an embodiment disclosed in the specification, an electronic device (e.g., the electronic device 101 of FIG. 1, the electronic device 201 of FIG. 2, the electronic device 301 of FIG. 3, the electronic device 401 of FIG. 4, or the electronic device 1001 of FIG. 10) may include a camera module (e.g., the camera module 180 of FIG. 1, or the camera module 411 of FIG. 4), a display (e.g., the display module 160 of FIG. 1 or the display 420 of FIG. 4) that displays AR content or VR content including at least one object, at least one processor (e.g., the processor 120 of FIG. 1 or the processor 430 of FIG. 4) operatively connected to the camera module and the display, and a memory (e.g., the memory 130 of FIG. 1 or the memory 440 of FIG. 4) operatively connected to the at least one processor and storing the AR content or VR content. The memory may store one or more instructions that, when executed, cause the at least one processor to obtain eye tracking data by using the camera module, to determine an eye fatigue level based on the eye tracking data, and to select one mode between a first mode for changing a setting of the display and a second mode for changing both the setting of the display and an output setting of the AR content or VR content, depending on the eye fatigue level.

According to an embodiment disclosed in the specification, the eye tracking data may include a measurement value for each of a plurality of parameters. The plurality of parameters may include at least one of an eye flicker frequency, a pupil adjustment speed, a degree of eye dryness, a degree of eye redness, or a degree of pupil tremor.

According to an embodiment disclosed in the specification, the instructions may cause the processor to obtain the eye tracking data at a specified period.

According to an embodiment disclosed in the specification, the instructions may cause the processor to identify an initial value of the eye tracking data, to calculate an amount of change by comparing the obtained eye tracking data with the initial value of the eye tracking data, and to determine the eye fatigue level depending on the amount of change.

According to an embodiment disclosed in the specification, the initial value may include an average value during a specified time period, an average value determined based on history information of a user of the electronic device, or a predetermined setting value.

According to an embodiment disclosed in the specification, the electronic device may further include a communication module (e.g., the communication module 190 of FIG. 1). The instructions may cause the processor to identify a user of the electronic device, to receive setting information and usage history information of an external electronic device of the user, through the communication module, and to determine the initial value based on the setting information and the usage history information.

According to an embodiment disclosed in the specification, the instructions may cause the processor to identify a weight for each of the plurality of parameters, to apply the weight to at least one parameter among the plurality of parameters, and to determine whether the measurement value satisfies a condition for determining the eye fatigue level. The condition may include the at least one parameter or a combination of at least two parameters.

According to an embodiment disclosed in the specification, the electronic device may further include a sensor module (e.g., the sensor module 176 of FIG. 1 or the sensor module 413 of FIG. 4). The instructions may cause the processor to obtain a biometric signal by using the sensor module and to determine the eye fatigue level further based on the biometric signal. The biometric signal may include at least one of electrocardiogram (ECG) or electro-encephalography (EEG).

According to an embodiment disclosed in the specification, the instructions may cause the processor to determine the eye fatigue level further based on usage history information of the electronic device. The usage history information may include at least one of a usage time of the electronic device, the setting of the display, or a type of an application being executed.

According to an embodiment disclosed in the specification, the instructions may cause the processor to select the first mode when the eye fatigue level is greater than or equal to a first threshold value and is less than a second threshold value and to select the second mode when the eye fatigue level is greater than or equal to the second threshold value.

According to an embodiment disclosed in the specification, a first item associated with the setting of the display may include at least one of a scan rate or brightness.

According to an embodiment disclosed in the specification, a second item associated with the output setting of the AR content or the VR content may include at least one of a number, sizes, locations, colors, or stereoscopic effect levels of objects output to the display.

According to an embodiment disclosed in the specification, the instructions may cause the processor to reduce a field of view (FOV) recognized by the camera module as the eye fatigue level increases.

According to an embodiment disclosed in the specification, the instructions may cause the processor to output a second virtual object mapped onto a first real object positioned within the FOV and to output a fifth virtual object onto which an operation of outputting a fourth virtual object mapped onto a third real object positioned out of the FOV is mapped.

According to an embodiment disclosed in the specification, the instructions may cause the processor to output the fourth virtual object when a user input selecting the fifth virtual object is received.

According to an embodiment disclosed in the specification, the instructions may cause the processor to adjust the eye fatigue level based on the AR content or the VR content to be output on the display.

According to an embodiment disclosed in the specification, a method for operating an electronic device for displaying content may include obtaining eye tracking data by using a camera module, determining an eye fatigue level based on the eye tracking data, and selecting one mode between a first mode for changing a setting of a display and a second mode for changing both the setting of the display and an output setting of the content, depending on the eye fatigue level.

According to an embodiment disclosed in the specification, the selecting of the mode may include selecting the first mode when the eye fatigue level is greater than or equal to a first threshold value and is less than a second threshold value and selecting the second mode when the eye fatigue level is greater than or equal to the second threshold value.

According to an embodiment disclosed in the specification, a first item associated with the setting of the display may include at least one of a scan rate or brightness.

According to an embodiment disclosed in the specification, a second item associated with the output setting of the content may include at least one of a number, sizes, locations, colors, or stereoscopic effect levels of objects output to the display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a camera module;
a display configured to display AR content or VR content including at least one object;
at least one processor operatively connected to the camera module and the display; and
a memory operatively connected to the at least one processor and configured to store the AR content or the VR content,
wherein the memory stores one or more instructions that, when executed, cause the at least one processor to:
obtain eye tracking data by using the camera module;
determine an eye fatigue level based on the eye tracking data;
when the eye fatigue level is below a threshold, display a screen, wherein the screen comprises a plurality of virtual objects; and
when the eye fatigue level exceeds the threshold, automatically remove some of the plurality of virtual objects and enlarge at least one virtual object from among the plurality of virtual objects.

2. The electronic device of claim 1, wherein the eye tracking data includes a measurement value for each of a plurality of parameters, and
wherein the plurality of parameters include an eye flicker frequency, a pupil adjustment speed, a degree of eye dryness, a degree of eye redness, and/or a degree of pupil tremor.

3. The electronic device of claim 1, wherein the one or more instructions cause the processor to:
obtain the eye tracking data at a specified period.

4. The electronic device of claim 1, wherein one or more the instructions cause the processor to:
identify an initial value of the eye tracking data;
calculate an amount of change by comparing the obtained eye tracking data with the initial value of the eye tracking data; and
determine the eye fatigue level depending on the amount of change.

5. The electronic device of claim 4, wherein the initial value includes an average value during a specified time period, an average value determined based on history information of a user of the electronic device, or a predetermined setting value.

6. The electronic device of claim 4, further comprising:
a communication module,
wherein the one or more instructions cause the processor to:
identify a user of the electronic device;
receive setting information and usage history information of an external electronic device of the user, through the communication module; and
determine the initial value based on the setting information and the usage history information.

7. The electronic device of claim 2, wherein the one or more instructions cause the processor to:
identify a weight for each of the plurality of parameters;
apply the weight to at least one parameter among the plurality of parameters; and
determine whether the measurement value satisfies a condition for determining the eye fatigue level, and
wherein the condition includes the at least one parameter or a combination of at least two parameters.

8. The electronic device of claim 1, further comprising:
a sensor module,
wherein the one or more instructions cause the processor to:
obtain a biometric signal by using the sensor module; and
determine the eye fatigue level further based on the biometric signal, and
wherein the biometric signal includes electrocardiogram (ECG) and/or electro-encephalography (EEG).

9. The electronic device of claim 1, wherein the one or more instructions cause the processor to:
determine the eye fatigue level further based on usage history information of the electronic device, and
wherein the usage history information includes a usage time of the electronic device, a setting of the display, and/or a type of an application being executed.

10. The electronic device of claim 1, wherein the one or more instructions cause the processor to:
after removing some of the plurality of virtual objects, enlarge remaining ones of the plurality of virtual object.

11. The electronic device of claim 1, wherein the one or more instructions cause the processor to:
as the eye fatigue level increases, reduce a field of view (FOV) recognized by the camera module.

12. The electronic device of claim 11, wherein the one or more instructions cause the processor to:
output a second virtual object mapped onto a first real object positioned within the FOV; and
output a fifth virtual object onto which an operation of outputting a fourth virtual object mapped onto a third real object positioned out of the FOV is mapped.

13. The electronic device of claim 12, wherein the one or more instructions cause the processor to:
output the fourth virtual object when a user input selecting the fifth virtual object is received.

14. The electronic device of claim 1, wherein the one or more instructions cause the processor to:
adjust the eye fatigue level based on the AR content or the VR content to be output on the display.

15. An electronic device comprising:
a camera module;
a display configured to display AR content or VR content including at least one object:
at least one processor operatively connected to the camera module and the display; and
a memory operatively connected to the at least one processor and configured to store the AR content or the VR content,
wherein the memory stores one or more instructions that, when executed, cause the at least one processor to:
obtain eye tracking data by using the camera module;
determine an eye fatigue level based on the eye tracking data;
select a first mode for changing a setting of the display when the eye fatigue level is greater than or equal to a first threshold value and is less than a second threshold value; and
select a second mode for changing both the setting of the display and an output setting of the AR content or the VR content when the eye fatigue level is greater than or equal to the second threshold value.

16. A method for operating an electronic device for displaying content, the method comprising:
- obtaining eye tracking data by using a camera module;
- determining an eye fatigue level based on the eye tracking data;
- when the eye fatigue level is below a threshold display a screen, wherein the screen comprises a plurality of virtual objects; and
- when the eye fatigue level exceeds the threshold, automatically removing some of the plurality of virtual objects and enlarging at least one virtual object from among the plurality of virtual objects.

17. The method of claim 16, wherein the removing some of the plurality of virtual objects includes:
- enlarging remaining ones of the plurality of virtual object after removing some of the plurality of virtual objects.

18. A method for operating an electronic device for displaying content, the method comprising:
- obtaining eye tracking data by using a camera module:
- determining an eye fatigue level based on the eye tracking data; and
- selecting one mode between a first mode for changing a setting of a display and a second mode for changing both the setting of the display and an output setting of the content, depending on the eye fatigue level, wherein the selecting of the mode includes:
- selecting the first mode when the eye fatigue level is greater than or equal to a first threshold value and is less than a second threshold value; and
- selecting the second mode when the eye fatigue level is greater than or equal to the second threshold value.

* * * * *